(12) United States Patent
Shin et al.

(10) Patent No.: US 12,426,085 B2
(45) Date of Patent: Sep. 23, 2025

(54) METHOD AND DEVICE FOR SIDELINK RESOURCE ALLOCATION IN WIRELESS COMMUNICATION SYSTEM

(71) Applicant: Samsung Electronics Co., Ltd., Gyeonggi-do (KR)

(72) Inventors: Cheolkyu Shin, Gyeonggi-do (KR); Hyunseok Ryu, Gyeonggi-do (KR); Youngbum Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 313 days.

(21) Appl. No.: 17/689,482

(22) Filed: Mar. 8, 2022

(65) Prior Publication Data
US 2022/0295552 A1    Sep. 15, 2022

(30) Foreign Application Priority Data

Mar. 9, 2021  (KR) ................ 10-2021-0031066
Mar. 24, 2021 (KR) ................ 10-2021-0038262

(51) Int. Cl.
*H04L 12/00*   (2006.01)
*H04W 72/02*   (2009.01)
*H04W 74/0808* (2024.01)

(52) U.S. Cl.
CPC ....... *H04W 74/0808* (2013.01); *H04W 72/02* (2013.01)

(58) Field of Classification Search
CPC . H04W 74/0808; H04W 72/02; H04W 72/23; H04W 92/18
USPC ........................................................ 370/329
See application file for complete search history.

(56) References Cited

U.S. PATENT DOCUMENTS

| | | | | |
|---|---|---|---|---|
| 11,647,540 | B2* | 5/2023 | Lee .............. | H04W 4/40 370/329 |
| 11,864,161 | B2* | 1/2024 | Lee .............. | H04L 1/1854 |
| 2020/0229198 | A1* | 7/2020 | Kung ............ | H04W 72/54 |

(Continued)

FOREIGN PATENT DOCUMENTS

KR   10-2021-0153976    12/2021

OTHER PUBLICATIONS

Panasonic, "Discussion on Sidelink Resource Allocation for Power Saving", R1-2100696, 3GPP TSG RAN WG1 #104, Jan. 25-Feb. 5, 2021, 4 pages.

(Continued)

*Primary Examiner* — Frantz Coby
(74) *Attorney, Agent, or Firm* — The Farrell Law Firm, P.C.

(57) ABSTRACT

The disclosure relates to a 5G or 6G communication system for supporting a higher data transmission rate. A method performed by a terminal in a communication system is provided, which includes receiving, from a base station, configuration information for a resource pool; identifying one or more preconfigured sensing schemes for the resource pool based on the configuration information, wherein the one or more preconfigured sensing schemes include full sensing, partial sensing, random resource selection, or a combination of two or more of the full sensing, the partial sensing, and the random resource selection; and selecting a sensing scheme for resource selection from among the one or more preconfigured sensing schemes.

14 Claims, 16 Drawing Sheets

(56) References Cited

U.S. PATENT DOCUMENTS

2020/0296690 A1* 9/2020 Lee .................. H04W 4/40
2021/0250772 A1* 8/2021 Farag .................. H04W 16/02

OTHER PUBLICATIONS

Nokia, Nokia Shanghai Bell, "Sidelink Resource Allocation for Power Saving", R1-2100538, 3GPP TSG RAN WG1 #104-e, Jan. 25-Feb. 5, 2021, 8 pages.
Ericsson, "Resource Allocation Mechanisms for Power Saving", R1-2100687, 3GPP TSG-RAN WG1 Meeting #104-e, Jan. 26-Feb. 5, 2021, 16 pages.
Samsung, "On Resource Allocation for Power Saving", R1-2101231, 3GPP TSG RAN WG1 Meeting #104-e, Jan. 25-Feb. 5, 2021, 7 pages.
International Search Report dated Jun. 15, 2022 issued in counterpart application No. PCT/KR2022/003238, 7 pages.

* cited by examiner

METHOD AND DEVICE FOR SIDELINK RESOURCE ALLOCATION IN WIRELESS COMMUNICATION SYSTEM

CROSS-REFERENCE TO RELATED APPLICATION(S)

This application is based on and claims priority under 35 U.S.C. § 119 to Korean Patent Application Nos. 10-2021-0031066 and 10-2021-0038262, which were filed in the Korean Intellectual Property Office on Mar. 9, 2021, and Mar. 24, 2021, respectively, the entire disclosure of each of which is incorporated herein by reference.

BACKGROUND

1. Field

The disclosure relates generally to a wireless mobile communication system and, particularly, to a method and a device for resource allocation, wherein a vehicle terminal supporting vehicle communication (e.g., vehicle-to-everything (V2X)) transmits information to or receives information from another vehicle terminal and a pedestrian portable terminal by using a sidelink.

2. Description of Related Art $5^{th}$ generation (5G) mobile communication technologies define relatively broader frequency bands such that higher transmission rates and new services are possible. 5G mobile communication can be implemented in "Sub 6 GHz" bands such as 3.5 GHz, and also in "Above 6 GHz" bands referred to as mmWave including 28 GHz and 39 GHz. In addition, there are intentions to implement $6^{th}$ generation (6G) mobile communication technologies, which may be referred to as beyond 5G systems, in terahertz bands (e.g., 95 GHz to 3 THz bands) in order to accomplish transmission rates fifty times faster than 5G mobile communication technologies and ultra-low latencies one-tenth of 5G mobile communication technologies.

In order to support 5G services and to satisfy performance requirements in connection with enhanced mobile broadband (eMBB), ultra reliable low latency communications (URLLC), and massive machine-type communications (mMTC), there has been ongoing standardization regarding beamforming and massive multi-input multi-output (MIMO) for mitigating radio-wave path loss and increasing radio-wave transmission distances in mmWave, supporting numerologies (e.g., operating multiple subcarrier spacings (SCSs)) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

There are also ongoing discussions regarding improvement and performance enhancement of initial 5G mobile communication technologies in view of services to be supported by 5G mobile communication technologies, and there has been physical layer standardization regarding technologies such as V2X for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, a non-terrestrial network (NTN), which is a UE-satellite direct communication for providing coverage in an area in which communication with terrestrial networks is unavailable, and positioning.

There has also been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handovers and dual active protocol stack (DAPS) handovers, and two-step random access for simplifying random access procedures (e.g., a 2-step random access channel (RACH) for NR).

There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, the number of devices that will be connected to communication networks is expected to exponentially increase, and it is accordingly expected that enhanced functions and performances of 5G mobile communication systems and integrated operations of connected devices will be necessary. To this end, new research is scheduled in connection with eXtended Reality (XR) for efficiently supporting augmented reality (AR), virtual reality (VR), mixed reality (MR), etc., 5G performance improvement and complexity reduction by utilizing artificial intelligence (AI) and machine learning (ML), AI service support, metaverse service support, and drone communication.

Such development of 5G mobile communication systems will serve as a basis for developing new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), and also for developing full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

An aspect of the disclosure is to provide a terminal and a method thereof for, when one or more resource selection modes (e.g., a resource selection mechanism, a resource selection scheme, or a sensing scheme) are (pre-)configured with resource pool information, selecting the corresponding modes and performing resource allocation for a sidelink transmission.

Another aspect of the disclosure is to provide a terminal and a method for performing multi-antenna transmission in a sidelink.

In accordance with an aspect of the disclosure, a method performed by a terminal in a communication system is provided. The method includes receiving, from a base station, configuration information for a resource pool; identifying one or more preconfigured sensing schemes for the resource pool based on the configuration information, wherein the one or more preconfigured sensing schemes include full sensing, partial sensing, random resource selection, or a combination of two or more of the full sensing, the partial sensing, and the random resource selection; and selecting a sensing scheme for resource selection from among the one or more preconfigured sensing schemes.

In accordance with another aspect of the disclosure, a terminal for use in a communication system is provided. The terminal includes a transceiver; and a processor configured to receive, from a base station, configuration information for a resource pool, identify one or more preconfigured sensing schemes for the resource pool based on the configuration information, wherein the one or more preconfigured sensing schemes include full sensing, partial sensing, random resource selection, or a combination of two or more of the full sensing, the partial sensing, and the random resource selection, and select a sensing scheme for resource selection from among the one or more preconfigured sensing schemes.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
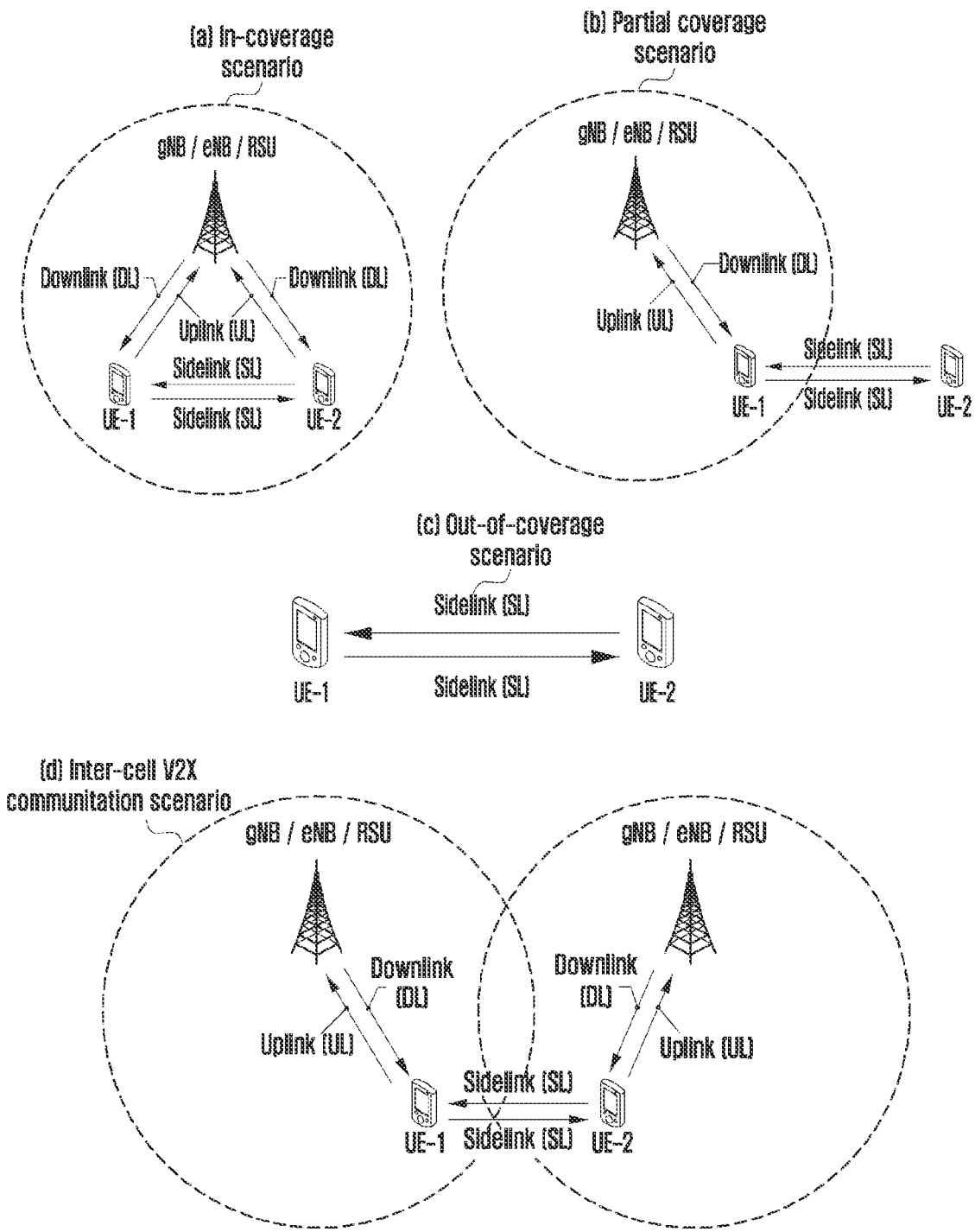
FIG. 1 illustrates a system according to an embodiment.

Hereinafter, various embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

In the accompanying drawings, some elements may be exaggerated, omitted, or schematically illustrated. Further, the size of each element does not completely reflect the actual size. Additionally, identical, similar, or corresponding elements may be provided with the same or like reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims.

Herein, each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). In some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not have to be limited to software or hardware. A "unit" may be constructed either to be stored in an addressable storage medium or to execute one or more processors. Therefore, a "unit" may include software elements, object-oriented software elements, class elements or task elements, processes, functions, properties, procedures, sub-routines, segments of a program code, drivers, firmware, micro-codes, circuits, data, database, data structures, tables, arrays, and/or parameters. The elements and functions provided by a "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, a "unit" may include one or more processors.

The following detailed description of embodiments of the disclosure is directed to NR as a radio access network (RAN) and packet core (e.g., a 5G system, a 5G core network, or a new generation (NG) core) as a core network, which are specified in the 5G mobile communication standards defined by 3rd generation partnership project (3GPP) long term evolution (LTE). However, embodiments of the disclosure are not limited to a specific standard and may be applied to other communication systems having similar backgrounds through some modifications without significantly departing from the scope of the disclosure.

In a 5G system, in order to support network automation, a network data collection and analysis function (NWDAF), which is a network function that provides a function of analyzing and providing data collected from a 5G network, may be defined. The NWDAF may collect/store/analyze information from the 5G network to provide a result thereof to an unspecified network function (NF), and an analysis result may be used independently in each NF.

In the following description, some of terms and names defined in the 3GPP standards (e.g., standards for 5G, NR, LTE, or similar systems) are used for the convenience of description. However, the disclosure is not limited by these terms and names, and may be applied in the same way to systems that conform other standards.

In the following description, terms for identifying access nodes, terms referring to network entities, terms referring to messages, terms referring to interfaces between network entities, terms referring to various identification information, etc., are illustratively used for the sake of convenience. However, the disclosure is not limited by the terms as used below, and other terms referring to subjects having equivalent technical meanings may be used.

In order to meet wireless data traffic demands that have increased after 4G communication system commercialization, efforts to develop an improved 5G communication system (e.g., NR) have been made. 5G communication systems have been designed to use resources in a mmWave band (e.g., a 28 GHz frequency band) in order to achieve a high data transmission rate. In the 5G communication systems, technologies, such as beamforming, massive MIMO, FD-MIMO, array antennas, analog beam-forming, and large-scale antennas, are being discussed to increase a radio propagation distance and mitigate a radio propagation path loss in the mmWave band. In addition, unlike LTE, a 5G communication system supports various SCSs, such as 30 kHz, 60 kHz, and 120 kHz including 15 kHz, a physical control channel uses polar coding, and a physical data channel uses an LDPC. Further, discrete Fourier transform spread orthogonal frequency division multiplexing (DFT-S-OFDM) and cyclic prefix (CP)-OFDM are used as a waveform for an uplink (UL) transmission.

While resources for hybrid automatic repeat request (HARQ) retransmission in units of transport blocks (TBs) are allocated in LTE, resources for HARQ retransmission based on a code block group (CBG) including multiple code blocks (CBs) may be additionally allocated in 5G.

In addition, in 5G communication systems, development for system network improvement is under way based on advanced small cells, cloud RANs, ultra-dense networks, device-to-device (D2D) communication, wireless backhaul, moving network, cooperative communication, coordinated multi-points (CoMP), reception-end interference cancellation, etc.

The Internet is evolving to the Internet of things (IoT) where distributed entities, i.e., things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), etc., have been recently researched. Such an IoT environment may provide intelligent Internet technology services by collecting and analyzing data generated among connected things. IoT may be applied to a variety of fields including smart homes, smart buildings, smart cities, smart or connected cars, smart grids, health care, smart appliances, and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered an example of convergence of the 5G technology with the IoT technology.

As described above, a plurality of services may be provided to a user in a communication system. In order to provide the plurality of services to a user, a method capable of providing a user with each service according to characteristics within the same time interval, and a device using the method are required.

Various services provided in the 5G communication system are being studied, and one of the services is a service that satisfies requirements for low latency and high reliability.

In particular, in the case of vehicle communication, in an NR V2X system, D2D unicast communication, groupcast (or multi-cast) communication, and broadcast communication are supported. Unlike LTE V2X, which aims at transmission or reception of basic safety information required for road driving of vehicles, NR V2X aims to provide more advanced services, such as platooning, advanced driving, an extended sensor, and remote driving.

In sidelink communication, a terminal may directly select a transmission resource for sidelink transmission via sensing. Various methods may be considered according to a state of the terminal and a transmission environment. For example, the following resource selection modes may be used.

Full sensing
Partial sensing
Random selection

Full sensing is a method of performing monitoring except for a slot in which the terminal performs sidelink transmission in a section defined as a sensing window. The monitoring may refer to decoding of a physical sidelink control channel (PSCCH) and measuring of a sidelink reference signal received power (SL-RSRP). In the case of full sensing, continuous monitoring should be performed in a section defined as a sensing window, and thus, there is a disadvantage in that power consumption of the terminal increases. Therefore, partial sensing and random selection may be considered for low power consumption of the terminal. Herein, for the convenience of description, partial sensing and random selection are utilized as a power saving mode, but the disclosure is not limited thereto.

Partial sensing is a method in which a monitoring slot is limited in comparison with full sensing. As a more detailed method, periodic-based partial sensing and contiguous partial sensing maybe considered.

Random selection is a method of randomly performing resource selection. In the case of random selection, a sensing operation may not be required. There may be a terminal that cannot perform sensing due to power consumption and a terminal that is capable of sensing. For example, in a case of a terminal which performs random selection but is capable of performing sensing, sensing may be performed. In this case, sensing may be for performing re-evaluation or pre-emption. Compared to full sensing, when partial sensing or random selection is performed, a sensing window for re-evaluation and pre-emption may be configured differently. If one of the resource selection modes is used, a terminal may perform resource selection using a corresponding method. However, if one or more resource selection modes are (pre-)configured with resource pool information, the terminal should select a resource selection mode to be used. In accordance with an embodiment of the disclosure, a method is provided for the terminal to select a resource selection mode to be used. By applying the disclosed method, resource allocation suitable for a transmission situation in a sidelink may be possible.

FIG. 1 illustrates a system according to an embodiment.

Referring to FIG. 1, in an in-coverage (IC) scenario (a), all V2X terminals (e.g., UE-1 and UE-2) are located within a coverage area of a base station. All the V2X terminals may receive data and control information via a downlink (DL) from the base station or may transmit data and control information via a UL to the base station. The data and control information may be for V2X communication and/or general cellular communication. The V2X terminals may transmit or receive the data and control information for V2X communication via a sidelink.

In a partial coverage (PC) scenario (b), UE-1 is located within the coverage area of the base station, but UE-2 is located outside the coverage area of the base station. UE-1, the V2X terminal located within the coverage area of the base station, may receive data and control information from the base station via a DL or may transmit data and control information via a UL to the base station. UE-2, the V2X terminal located outside the coverage area of the base station, may not receive data and control information via a DL from the base station, and may not transmit data and control information via a UL to the base station. However, the UE-2 may transmit or receive data and control information for V2X communication to or from the UE-1 via a sidelink.

In an out-of-coverage (OOC) scenario (c), all of the V2X terminals are located outside the coverage area of the base station. Therefore, the V2X terminals (UE-1 and UE-2) may not receive data and control information from the base station via a DL, and may not transmit data and control information via a UL to the base station. However, the V2X terminals (UE-1 and UE-2) may still transmit or receive data and control information for V2X communication via a sidelink.

In an inter-cell V2X communication scenario (d), V2X communication is performed between the V2X terminals (UE-1 and UE-2) located in different cells.

More specifically, UE-1 and UE-2 are camping on (e.g., in a radio resource control (RRC) disconnected state, such as an RRC idle state) or connected to (e.g., in an RRC connection state) different base stations. The UE-1 may be a V2X transmission terminal and the UE-2 may be a V2X reception terminal. Alternatively, the UE-1 may be a V2X reception terminal, and the UE-2 may be a V2X transmission terminal. The UE-1 may receive a system information block (SIB) from a base station to which the UE-1 is connected (or on which the UE-1 is camping), and the UE-2 may receive an SIB from another base station to which the UE-2 is connected (or on which the UE-2 is camping). An existing SIB or an SIB defined separately for V2X may be used as the SIB. Information of the SIB received by the UE-1 and information of the SIB received by the UE-2 may be different from each other. Therefore, in order to perform V2X communication between the UE-1 and the UE-2 located in different cells, information may be unified, or information thereof may be signaled so that a method of interpreting SIB information transmitted from each of the different cells may be performed.

Although FIG. 1 illustrates the V2X system including only the two V2X terminals (UE-1 and UE-2) for convenience of description, the disclosure is not limited thereto, and communication may be performed between more V2X terminals. An interface (e.g., a UL and a DL) between a base station and V2X terminals may be referred to as a Uu interface, and a sidelink between V2X terminals may be referred to as a PC5 interface. In the disclosure, these terms may be used interchangeably.

Herein, a terminal may include a vehicle that supports vehicle-to-vehicle (V2V) communication, a vehicle or a pedestrian handset (e.g., a smartphone) that supports vehicle-to-pedestrian (V2P) communication, a vehicle that supports vehicle-to-network (V2N) communication, or a vehicle that supports communication between a vehicle and a transportation infrastructure, e.g., vehicle-to-infrastructure (V2I) communication. A terminal may also include a road side unit (RSU) equipped with a terminal function, an RSU equipped with a base station function, or an RSU equipped with a part of the base station function and a part of the terminal function.

A base station may support both V2X communication and general cellular communication, or only V2X communication. The base station may be a 5G base station (e.g., a gNB), a 4G base station (e.g., an eNB), or an RSU. Accordingly, abase station may be referred to as an RSU.

Figure 2:
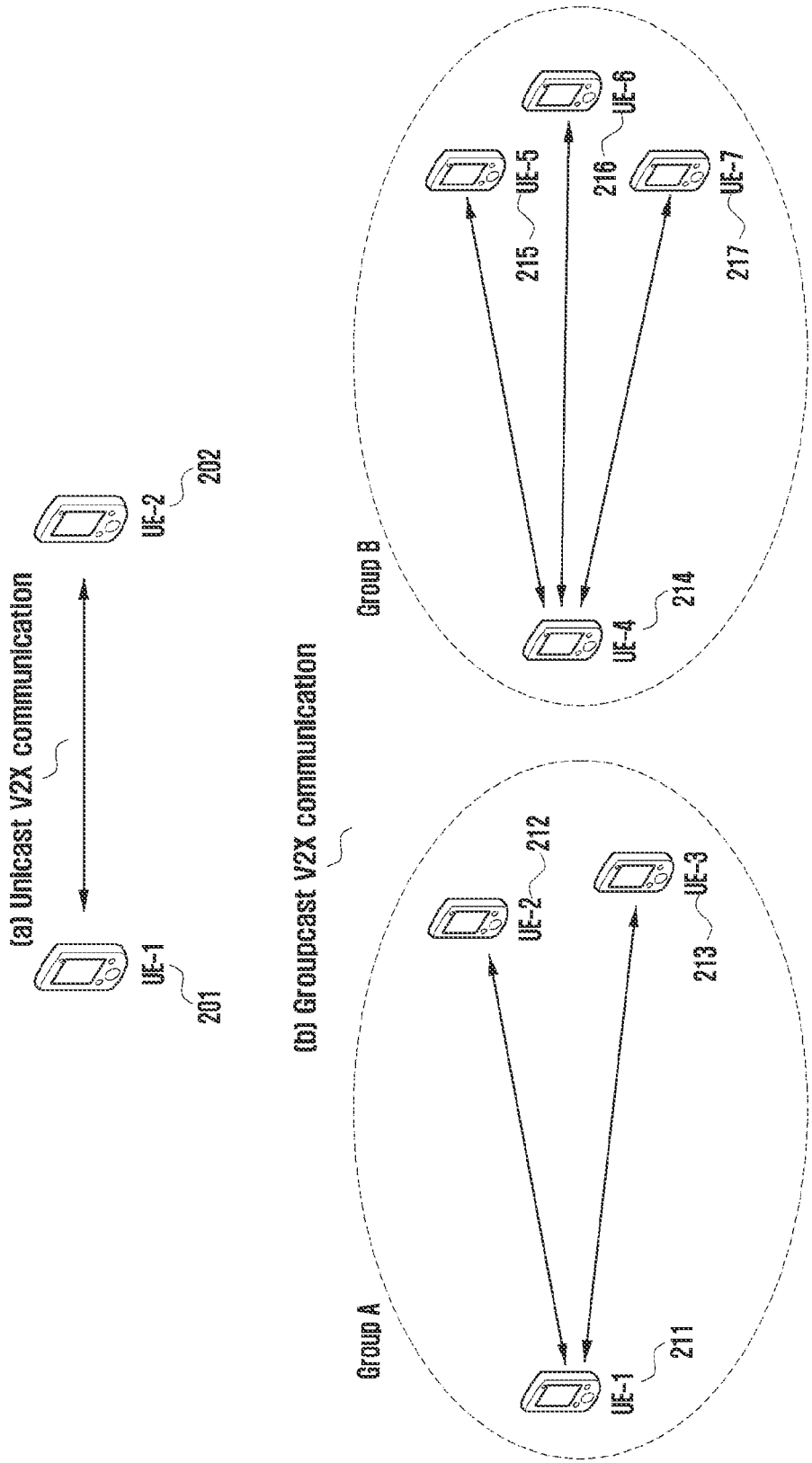
FIG. 2 illustrates a V2X communication method performed via a sidelink according to an embodiment.

FIG. 2 illustrates a V2X communication method performed via a sidelink according to an embodiment.

Referring to FIG. 2, in unicast V2X communication (a), a UE-1 (e.g., a transmission (TX) terminal) 201 and a UE-2 (e.g., a reception (RX) terminal) 202 may perform one-to-one communication, which may be referred to as unicast communication.

In groupcast V2X communication (b), a TX terminal and an RX terminal may perform one-to-many communication, which may be referred to as groupcast or multicast.

More specifically, a UE-1 211, a UE-2 212, and a UE-3 213 form one group (i.e., group A) to perform groupcast communication, and a UE-4 214, a UE-5 215, a UE-6 216, and a UE-7 217 form another group (i.e., group B) to perform groupcast communication. Each terminal may perform groupcast communication only within a group to which each terminal itself belongs, and communication between different groups may be performed via unicast, groupcast, or broadcast communication. Although FIG. 2 illustrates that two groups (i.e., group A and group B) are formed in the groupcast V2X communication (b), the disclosure is not limited thereto.

V2X terminals may also perform broadcast communication, wherein all V2X terminals receive data and control information transmitted by a V2X transmission terminal via a sidelink. For example, if it is assumed in the groupcast V2X communication (b) that the UE-1 211 is a transmission terminal for broadcast, all terminals (i.e., the UE-2 212, the UE-3 213, the UE-4 214, the UE-5 215, the UE-6 216, and the UE-7 217) may receive data and control information transmitted by the UE-1 211.

NR V2X, unlike in LTE V2X, may support a vehicle terminal transmitting data to only one specific node via unicast and data being transmitted to specific multiple nodes via groupcast. For example, such unicast and groupcast technologies may be used in a service scenario such as platooning, which is a technology for connecting two or more vehicles via a single network so as to move the vehicles in a cluster. Specifically, unicast communication may be used for controlling a specific node by a leader node of a group connected via platooning, and groupcast communication may be used for concurrently controlling a group including specific multiple nodes.

Figure 3:
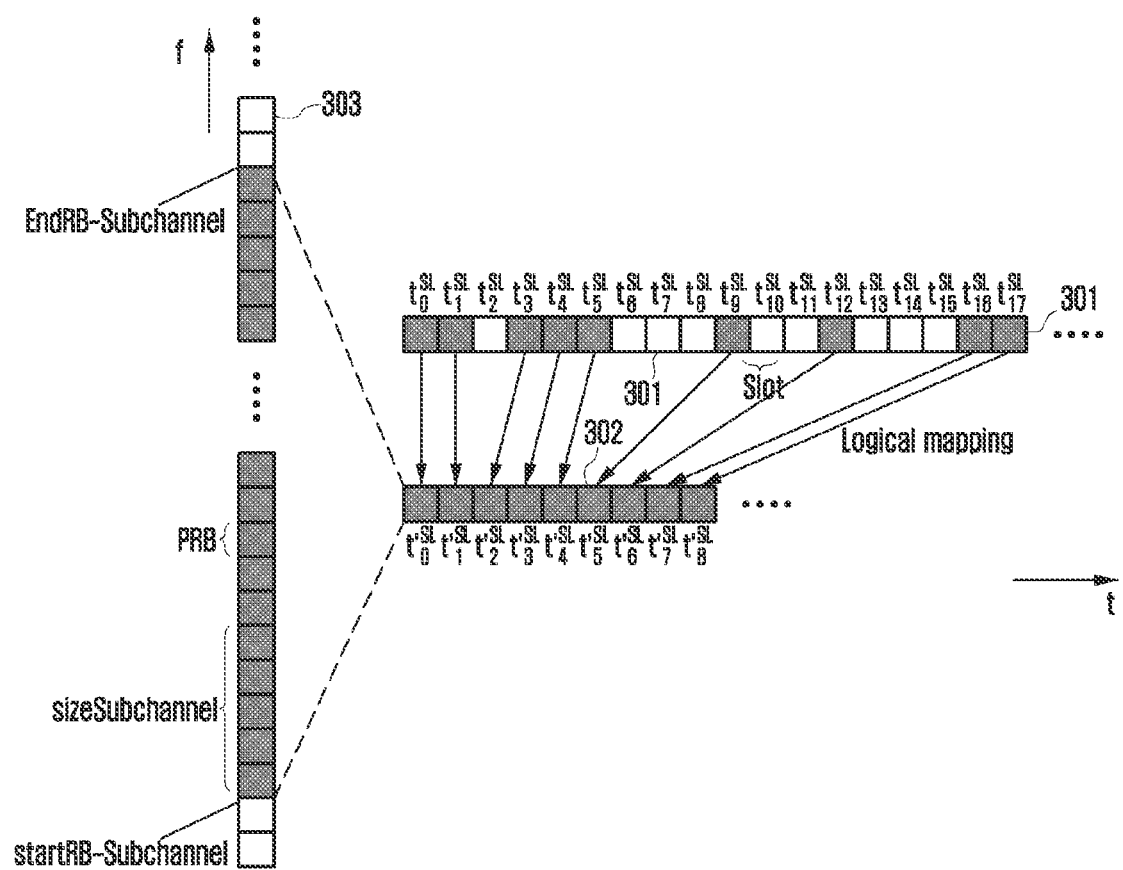
FIG. 3 illustrates a resource pool defined as a set of time and frequency resources used for sidelink transmission and reception according to an embodiment.

FIG. 3 illustrates a resource pool defined as a set of time and frequency resources used for sidelink transmission and reception according to an embodiment.

In a resource pool, a resource granularity of a time axis may be a slot. A resource granularity of a frequency axis may be a sub-channel including one or more physical resource blocks (PRBs). Herein, an example of a case in which a resource pool is non-contiguously allocated in time is described, but a resource pool may be contiguously allocated in time.

Also, in the disclosure, an example of a case in which a resource pool is contiguously allocated in frequency is described, but a method in which a resource pool is non-contiguously allocated in frequency is not excluded.

Referring to FIG. 3, a resource pool may be non-contiguously allocated in time as illustrated in 301 and resource allocation granularity in time may be configured by slots. A sidelink slot may be defined in slots used for a UL. Specifically, a symbol length used for a sidelink in one slot may be configured as sidelink BWP information. Therefore, among the slots used for a UL, slots in which a symbol length configured for a sidelink is not guaranteed may not be sidelink slots. In slots belonging to the resource pool, a slot in which a sidelink synchronization signal block (S-SSB) is transmitted is excluded.

Referring to 301, except for such slots, a set of slots available for a sidelink in time is illustrated as ($t_0^{SL}$, $t_1^{SL}$, $t_2^{SL}$, . . . ). The shaded slots in 301 indicate sidelink slots belonging to the resource pool. The sidelink slots belonging to the resource pool may be (pre-)configured with resource pool information via a bitmap.

Referring to 302, a set of sidelink slots belonging to the resource pool in time is illustrated as ($t'^{SL}_0$, $t'^{SL}_1$, $t'^{SL}_2$, . . . ). In the disclosure, (pre-)configuration may refer to configuration information pre-configured for a terminal and stored in advance, or may refer to a case in which a terminal is configured in a cell-common manner from a base station. Here, cell-common may indicate that terminals within a cell receive configurations of the same information from a base station. In this case, a method in which a terminal acquires cell-common information by receiving a sidelink SIB (SL-SIB) from a base station may be considered. Further, it may also refer to a case in which a terminal is configured in a UE-specific manner after an RRC connection to a base station is established.

Herein, "UE-specific" may be replaced with the term "UE-dedicated", and may indicate that configuration information is received with a specific value for each terminal.

A method in which a terminal acquires UE-specific information by receiving an RRC message from a base station may be considered. In addition, for (pre-)configuration, a method of configuration with resource pool information and a method of configuration not in resource pool information may be considered.

In the case of (pre-)configuration with resource pool information, all terminals operating in a corresponding resource pool may operate with common configuration information, except for a case in which a terminal is configured in a UE-specific manner after an RRC connection with a base station is established. However, the method in which (pre-)configuration is not configuration in resource pool information is basically a method of being configured independently of resource pool configuration information. For example, one or more modes may be (pre-)configured in the resource pool (e.g., modes A, B, and C), and information (pre-)configured independently of resource pool configuration information may indicate a mode to be used from among the modes (pre-)configured in the resource pool.

Referring to 303, contiguous allocation of the resource pool in frequency is illustrated. On the frequency axis, resource allocation may be configured with sidelink BWP information and may be performed in units of sub-channels. A sub-channel may be defined as a resource allocation granularity in frequency, which includes one or more PRBs. That is, the sub-channel may be defined to be an integer multiple of a PRB.

Referring to 303, the sub-channel may include five contiguous PRBs, and a sub-channel size (sizeSubchannel) may be a size of five contiguous PRBs. The content illustrated in FIG. 3 is merely an example of the disclosure, and a size of a sub-channel may be configured differently.

Although one sub-channel may be configured by contiguous PRBs, one sub-channel is not necessarily configured by contiguous PRBs. The sub-channel may be a basic resource allocation granularity for a PSSCH. In 303, startRB-Subchannel may indicate a start position of the sub-channel in frequency in the resource pool. When resource allocation is performed in units of sub-channels on the frequency axis, a resource in frequency may be allocated via configuration information on a resource block (RB) index (startRB-Sub-channel) where the sub-channel starts, information (sizeSub-channel) on the number of PRBs constituting the sub-channel, the total number of sub-channels (numSubchannel), etc. Information on startRB-Subchannel, sizeSubchannel, and numSubchannel may be (pre-)configured with resource pool information in frequency.

Figure 4:
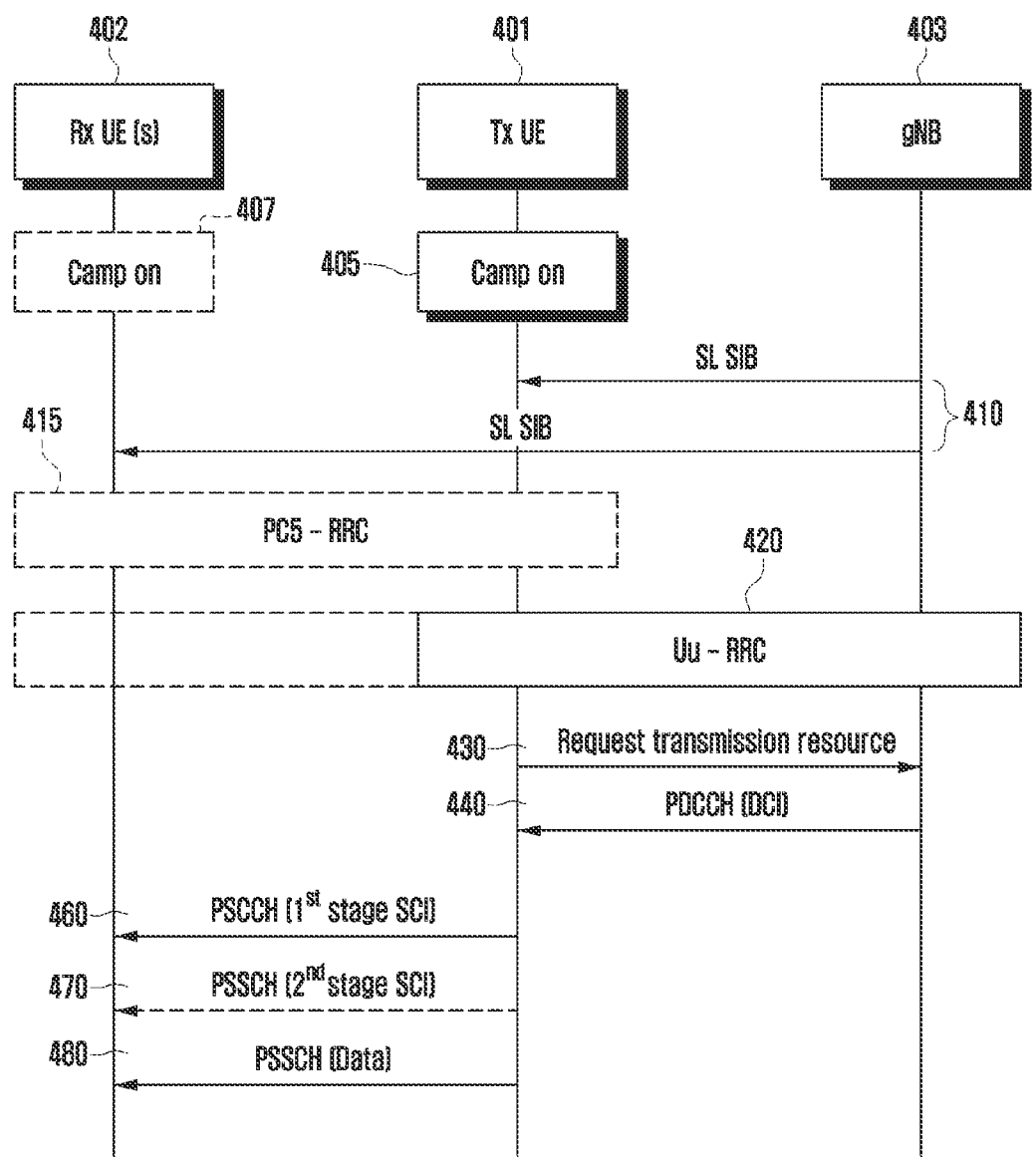
FIG. 4 is a sequence diagram illustrating a method of allocating a transmission resource in a sidelink by a base station according to an embodiment.

FIG. 4 is a sequence diagram illustrating a method for allocating a transmission resource in a sidelink by a base station according to an embodiment.

Herein, a method of allocating a transmission resource by a base station in a sidelink will be referred to as Mode 1. Mode 1 may be a scheduled resource allocation. Mode 1 may indicate a method in which a base station allocates resources used for sidelink transmission to RRC-connected terminals in a dedicated scheduling scheme. A method of Mode 1 may be effective for interference management and resource pool management because a base station can manage sidelink resources.

Referring to FIG. 4, a transmission terminal 401 camps on a base station (cell) 403 in step 405. To camp on may refer to, for example, a state in which a terminal in a standby state (e.g., an RRC_IDLE) may select (or reselect) a base station (cell) and receive system information or paging information, etc.

If a reception terminal 402 is located within the coverage of the base station (cell) 403, the reception terminal 402 may camp on the base station (cell) 403 in step 407. However, if the reception terminal 402 is located outside the coverage of the base station (cell) 403, the reception terminal 402 may not camp on the base station (cell) 403.

The reception terminal 402 represents a terminal receiving data transmitted by the transmission terminal 401.

The transmission terminal 401 and the reception terminal 402 receive an SL-SIB from the base station 403 in step 410. The SL-SIB information may include sidelink resource pool information for sidelink transmission or reception, parameter configuration information for sensing operation, information for configuring sidelink synchronization, carrier information for sidelink transmission or reception operating at different frequencies, etc.

If data traffic for V2X is generated in the transmission terminal 401, the transmission terminal 401 may be RRC-connected to the base station 403 in step 420. The RRC connection between the terminal and the base station may be referred to as a Uu-RRC connection. A Uu-RRC connection procedure 420 may be performed prior to data traffic generation of the transmission terminal 401. In Mode 1, the transmission terminal may perform transmission to the reception terminal via a sidelink in a state where the Uu-RRC connection procedure between the base station 403 and the reception terminal 402 in step 420 is performed. However, in Mode 1, the transmission terminal 401 may perform transmission to the reception terminal via a sidelink even in a state where the Uu-RRC connection procedure between the base station 403 and the reception terminal 402 in step 420 is not performed.

The transmission terminal 401 requests, from the base station in step 430, a transmission resource enabling V2X communication with the reception terminal 402. The transmission terminal 401 may request a sidelink transmission resource from the base station 403 by using a physical UL control channel (PUCCH), an RRC message, or a medium access control (MAC) control element (CE). The MAC CE may be a buffer status report (BSR) MAC CE of a new format (at least including information on an indicator indicating a BSR for V2X communication and information on a size of data buffered for D2D communication), etc. The transmission terminal 401 may request a sidelink resource via a scheduling request (SR) bit transmitted through the PUCCH.

Subsequently, the base station 403 may allocate a V2X transmission resource to the transmission terminal 401. The base station may allocate the transmission resource in a dynamic grant or configured grant (CG) scheme.

In a dynamic grant scheme, the base station may allocate a resource for TB transmission via DL control information (DCI). Sidelink scheduling information included in the DCI may include parameters related to transmission time point and frequency allocation position information fields of initial transmission and retransmission. DCI for the dynamic grant scheme may be cyclic redundancy check (CRC) scrambled with a sidelink vehicle radio network temporary identifier (SL-V-RNTI) so as to indicate the dynamic grant scheme.

In a CG scheme, the base station may periodically allocate a resource for TB transmission by configuring a semi-persistent scheduling (SPS) interval via a Uu-RRC. The base station may allocate a resource for one TB via DCI. The sidelink scheduling information for one TB included in the DCI may include parameters related to transmission time point and frequency allocation position information of initial transmission and retransmission resources. If a resource is allocated in the CG scheme, a transmission time point (occasion) and a frequency allocation position of initial transmission and retransmission for one TB may be determined by the DCI, and a resource for a subsequent TB may be repeated at SPS intervals. The DCI for the CG scheme may be CRC scrambled with a sidelink SPS vehicle radio network temporary identifier (SL-SPS-V-RNTI) so as to indicate the dynamic grant scheme. The CG scheme may be classified into a type1 CG and a type2 CG. In a type2 CG, a resource configured by the CG via DCI may be activated/deactivated.

Therefore, in a case of Mode 1, the base station 403 may indicate scheduling for sidelink transmission with the reception terminal 402 to the transmission terminal 401 via DCI transmission through a physical DL control channel (PDCCH) in step 440.

Specifically, there may be DCI format 3_0 or DCI format 3_1 for DCI used by the base station 403 for sidelink communication for the transmission terminal 401. DCI format 3_0 may be defined as DCI for scheduling of an NR sidelink in one cell, and DCI format 3_1 may be defined as DCI for scheduling of an LTE sidelink in one cell. The DCI format described above is only an example, and the disclosure is not limited thereto.

In a broadcast transmission, the transmission terminal 401 may perform transmission without an RRC configuration 415 for a sidelink. Contrary to this, in a unicast or groupcast transmission, the transmission terminal 401 may perform RRC connection with another terminal on a one-to-one basis. In distinction from a Uu-RRC connection, the RRC connection between terminals may be referred to as a PC5-RRC connection in step 415. In a groupcast, the PC5-RRC in step 415 may be individually connected between terminals in a group. Although the connection of the PC5-RRC in step 415 is illustrated as an operation after transmission of the SL-SIB in step 410, it may be performed at any time before transmission of the SL-SIB in step 410 or before transmission of sidelink control information (SCI).

Subsequently, the transmission terminal 401 may transmit SCI (1st stage) to the reception terminal 402 through a PSCCH in step 460.

The transmission terminal 401 may transmit SCI (2nd stage) to the reception terminal 402 through the PSSCH in step 470. The 1st stage SCI may include information related to resource allocation, and the 2nd stage SCI may include other control information.

The transmission terminal 401 may transmit data to the reception terminal 402 through the PSSCH in step 480. The SCI (1st stage), SCI (2nd stage), and the PSSCH may be transmitted together in the same slot.

Figure 5:
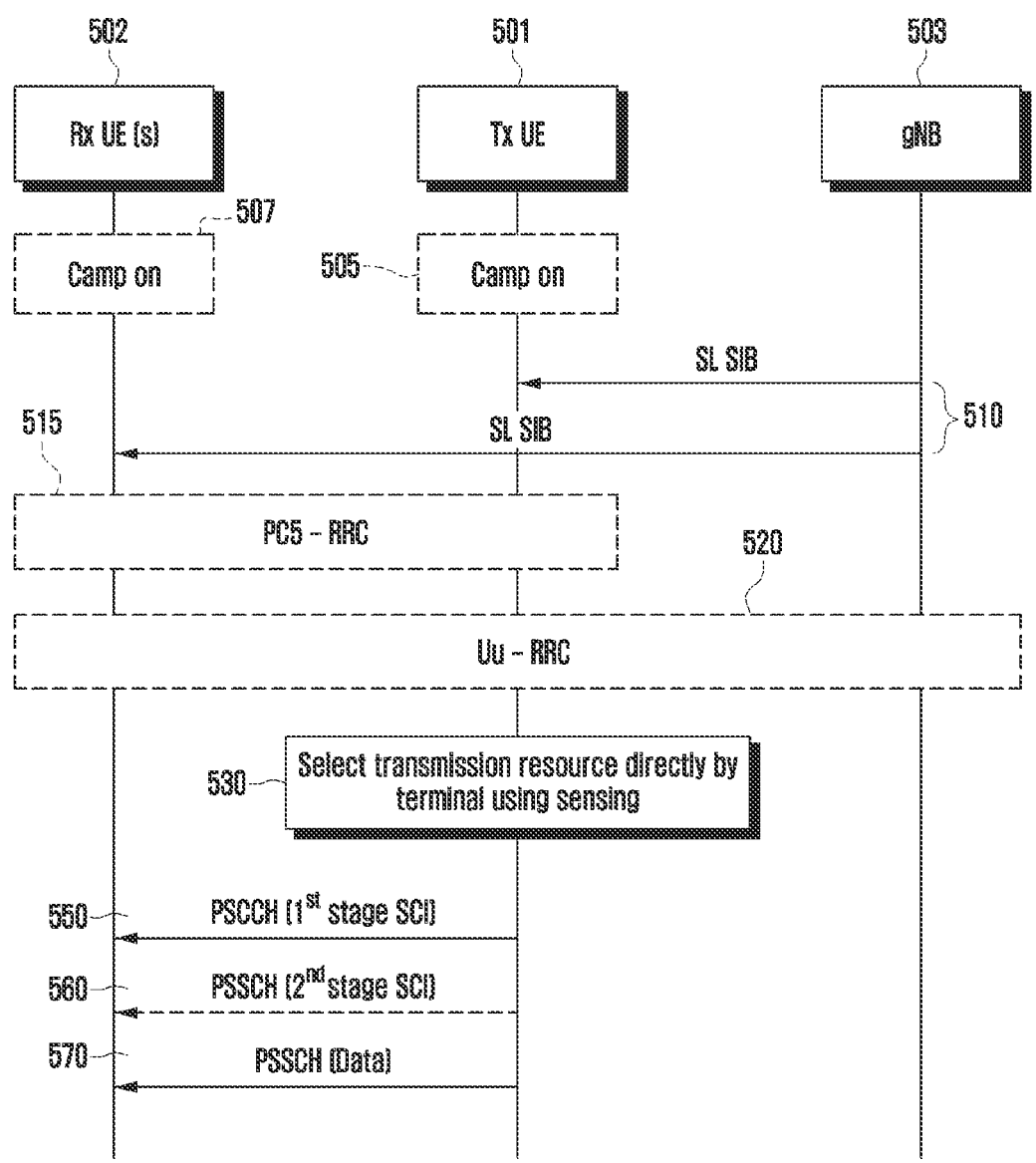
FIG. 5 is a sequence diagram illustrating a method of directly allocating a sidelink transmission resource via sensing by a terminal in a sidelink according to an embodiment.

FIG. 5 is a sequence diagram illustrating a method for directly allocating a sidelink transmission resource via sensing by a terminal in a sidelink according to an embodiment.

Hereinafter, a method, in which a terminal directly allocates a sidelink transmission resource via sensing in a sidelink, will be referred to as Mode 2. Mode 2 may also be referred to as UE autonomous resource selection.

Referring to FIG. 5, in Mode 2, a base station 503 may provide, as system information, a sidelink transmission/reception resource pool for V2X, and a transmission terminal 501 may select a transmission resource according to a determined rule. Unlike Mode 1, in which a base station directly participates in resource allocation, there is a difference in FIG. 5 in that the transmission terminal 501 autonomously selects a resource and transmits data, based on a resource pool received in advance via system information.

More specifically, the transmission terminal 501 camps on a base station (cell) 503 in step 505. Unlike the aforementioned FIG. 4, in the case of Mode 2, if the transmission terminal 501 is located within coverage area of the base station (cell) 503, the transmission terminal 501 may camp on the base station (cell) 503 in step 507. However, if the transmission terminal 501 is located outside the coverage area of the base station (cell) 503, the transmission terminal 501 may not camp on the base station (cell) 503.

If a reception terminal 502 is located within the coverage area of the base station (cell) 503, the reception terminal 502 may camp on the base station (cell) 503 in step 507. However, if the reception terminal 502 is located outside the coverage area of the base station (cell) 503, the reception terminal 502 may not camp on the base station (cell) 503.

Herein, the reception terminal 502 represents a terminal receiving data transmitted by the transmission terminal 501.

The transmission terminal 501 and the reception terminal 502 receive an SL-SIB from the base station 503 in step 510. The SL-SIB information may include sidelink resource pool information for sidelink transmission or reception, parameter configuration information for sensing operation, information for configuring sidelink synchronization, carrier information for sidelink transmission or reception operating at different frequencies, etc.

A difference between FIG. 4 and FIG. 5 is that the base station 503 and the terminal 501 operate in an RRC connected state in FIG. 4, whereas the terminal may operate also in an idle mode 520 (e.g., an RRC disconnected state) in FIG. 5. Even in the RRC connected state 520, the base station 503 may allow, without directly participating in resource allocation, the transmission terminal 501 to autonomously select a transmission resource. Here, the RRC connection between the terminal 501 and the base station 503 may be referred to as a Uu-RRC 520.

When data traffic for V2X is generated in the transmission terminal 501, the transmission terminal 501 may be configured with a resource pool via system information received from the base station 503, and the transmission terminal 501 may directly select, in step 530, a resource of a time/frequency domain via sensing within the configured resource pool. When a resource is finally selected, the selected resource is determined as a grant for sidelink transmission.

In a broadcast transmission, the transmission terminal 501 may perform transmission without an RRC configuration 515 for a sidelink. However, in a unicast or groupcast transmission, the transmission terminal 501 may perform an RRC connection with another terminal on a one-to-one basis. In distinction from a Uu-RRC connection, the RRC connection between terminals may be referred to as a PC5-RRC connection in step 515. In a groupcast, the PC5-RRC 515 may be individually connected between terminals in a group. Although the connection of the PC5-RRC 515 is illustrated in FIG. 5 as an operation after transmission of the SL-SIB in 510, it may be performed at any time before transmission of the SL-SIB in 510 or before transmission of SCI.

The transmission terminal 501 transmits SCI (1st stage) to the reception terminal 502 through a PSSCH in step 550. The transmission terminal 501 transmits SCI (2nd stage) to the reception terminal 502 through the PSSCH in step 560. The 1st stage SCI may include information related to resource allocation, and 2nd stage SCI may include other control information.

The transmission terminal 501 transmits data to the reception terminal 502 through the PSSCH in 570. The SCI (1st stage), SCI (2nd stage), and the PSSCH may be transmitted together in the same slot.

Specifically, the SCI used by the transmission terminals 401 and 501 for sidelink communication to the reception terminals 402 and 502 is SCI (1st stage) and may include SCI format 1-A. Also, SCI (2nd stage) and may include SCI format 2-A or SCI format 2-B. In SCI (2nd stage), if HARQ feedback is not used, or if HARQ feedback is used and both ACK and NACK information is included, SCI format 2-A may include information for PSSCH decoding so as to be used. However, if HARQ feedback is not used, or if HARQ feedback is used and only NACK information is included, SCI format 2-B may include information for PSSCH decoding so as to be used. For example, SCI format 2-B may be limitedly used for groupcast transmission. The SCI format described above is only an example, and the disclosure is not limited thereto.

Figure 6A:
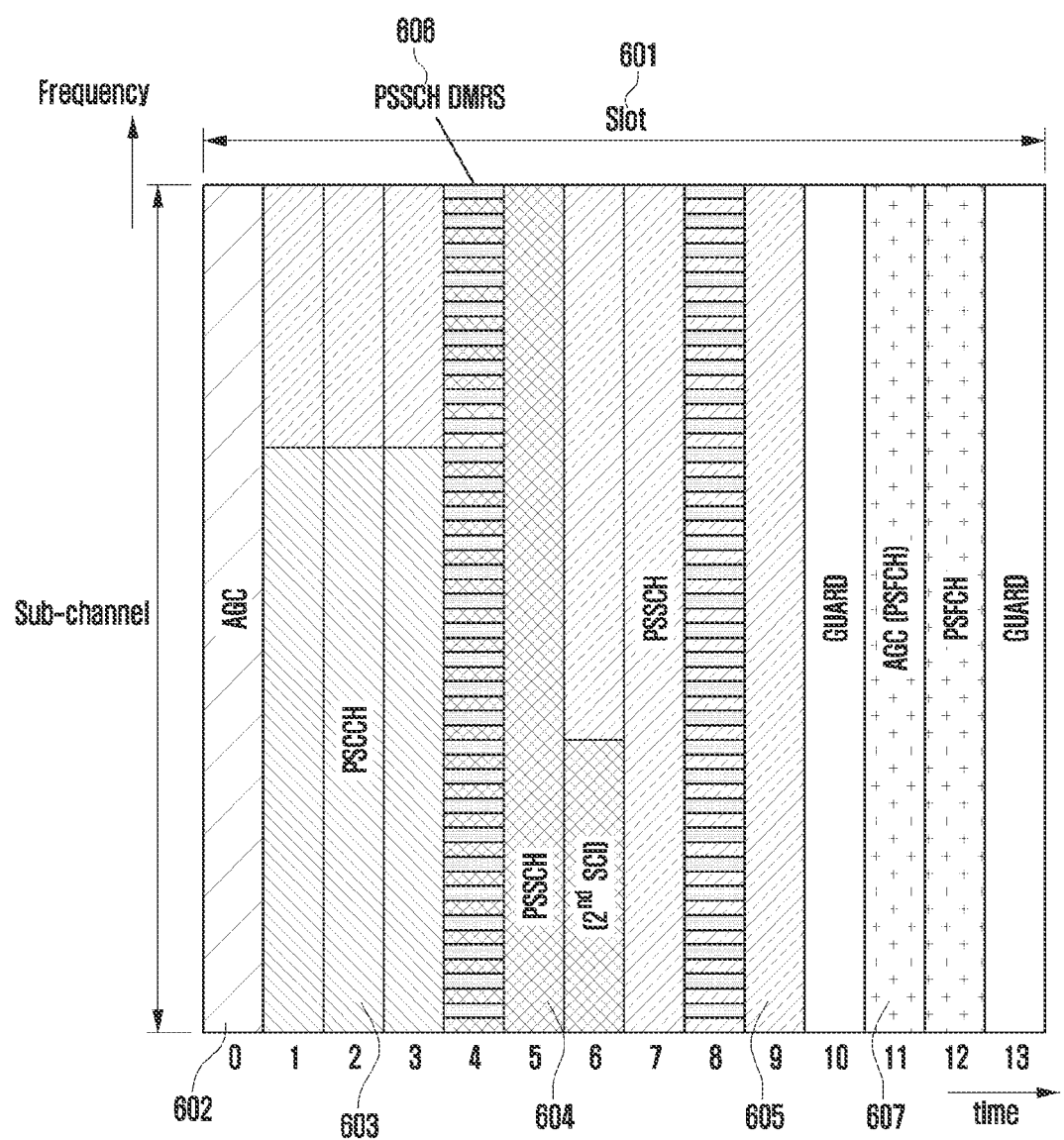
FIG. 6A illustrates a mapping structure of physical channels mapped to one slot in a sidelink according to an embodiment.
Figure 6B:
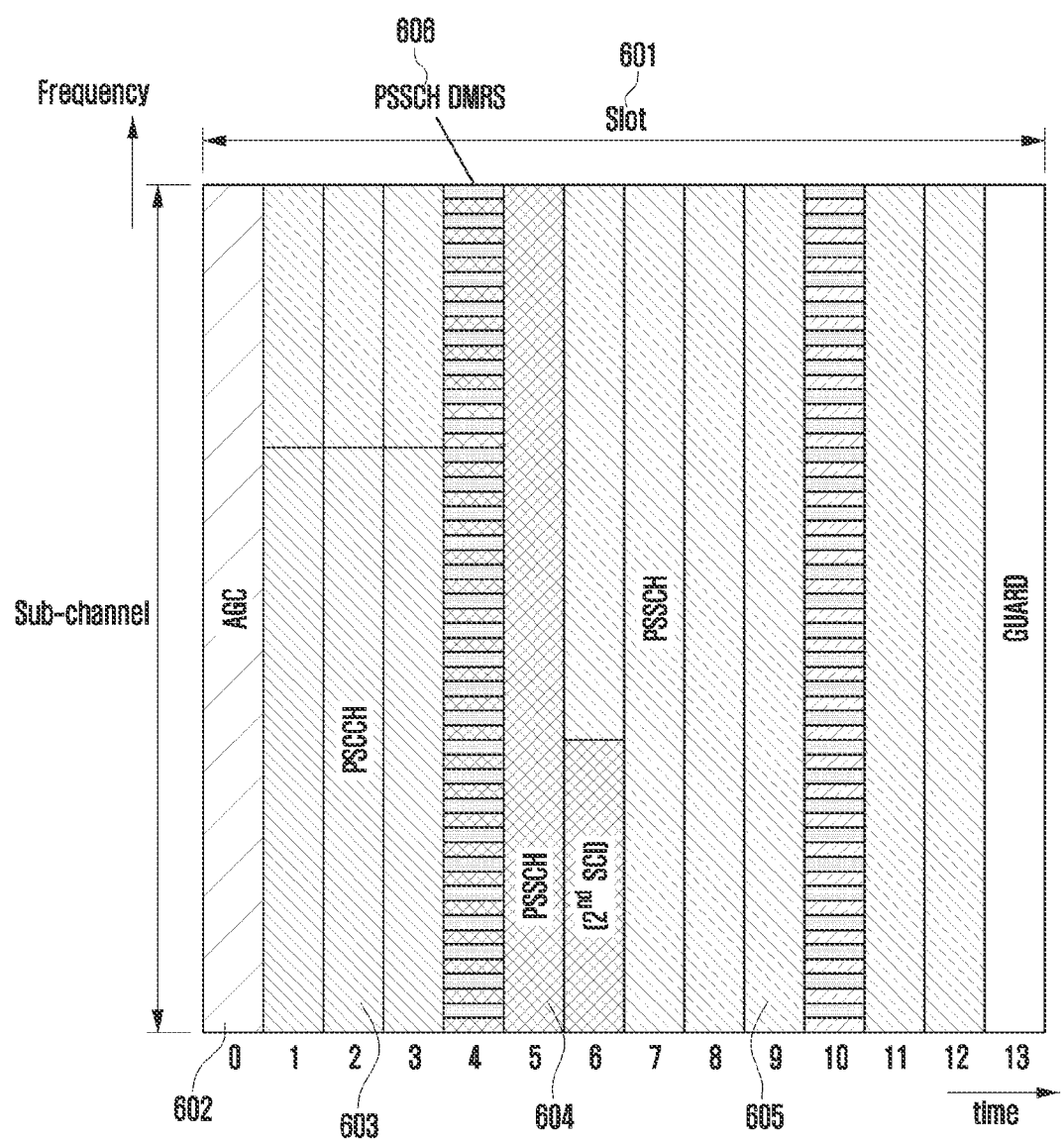
FIG. 6B illustrates a mapping structure of physical channels mapped to one slot in a sidelink according to an embodiment.

FIGS. 6A and 6B illustrate mapping structures of physical channels mapped to one slot in a sidelink according to embodiments. Specifically, FIGS. 6A and 6B illustrate mapping for PSCCH/physical sidelink shared channel (PSSCH)/physical sidelink feedback channel (PSFCH) physical channels.

In a PSFCH, when HARQ feedback of a sidelink is activated in a higher layer, a time resource of the PSFCH may be (pre-)configured with resource pool information. The time resource in which the PSFCH is transmitted may be (pre-)configured to one value of every 0, 1, 2, and 4 slots. Here, "0" indicates that no PSFCH resource is used. 1, 2, and 4 may indicate that a PSFCH resource is transmitted in every 1, 2, and 4 slots, respectively.

A structure of a slot in which no PSFCH resource is configured is illustrated in FIG. 6A, and a structure of a slot in which a PSFCH resource is configured is illustrated in FIG. 6B.

A PSCCH/PSSCH/PSFCH may be allocated to one or more sub-channels in frequency.

Referring to FIGS. 6A and 6B, in order to describe mapping in time for PSCCH/PSSCH/PSFCH, one or more symbols before a transmission terminal transmits the PSCCH/PSSCH/PSFCH in a corresponding slot 601 may be used as an area 602 for automatic gain control (AGC). When the corresponding symbol(s) is used for AGC, a method of repetitively transmitting a signal of another channel in a corresponding symbol area may be considered. Some of PSCCH symbols or PSSCH symbols may be considered for a repetitive signal of another channel. Alternatively, a preamble may be transmitted in the AGC area.

When a preamble signal is transmitted, it is advantageous that an AGC execution time may be further shortened compared to a method of repetitively transmitting a signal of another channel. When a preamble signal is transmitted for AGC, a specific sequence may be used as the preamble signal 602, and in this case, a sequence, such as a PSSCH demodulation reference signal (DMRS), a PSCCH DMRS, and a channel state information reference signal (CSI-RS), may be used as the preamble.

In the disclosure, a sequence used as a preamble is not limited to the above-described example.

According to FIGS. 6A and 6B, control information related to resource allocation to initial symbols of the slot may be transmitted on a PSCCH 603 via 1st stage SCI, and other control information may be transmitted in an area 604 of the PSSCH via 2nd stage SCI. Data scheduled by the control information may be transmitted on a PSSCH 605. In this case, a position in time at which the 2nd stage SCI is transmitted may be mapped from a symbol in which a first PSSCH DMRS 606 is transmitted.

The position in time at which the PSSCH DMRS 606 is transmitted may be different in a slot in which the PSFCH is transmitted and a slot in which no PSFCH is transmitted, as illustrated in FIG. 6A and FIG. 6B.

FIG. 6A illustrates that a PSFCH 607, which is a physical channel for transmission of feedback information, is located in the last part of the slot. By securing a predetermined vacant time (i.e., a guard) between the PSSCH 605 and the PSFCH 607, a terminal having transmitted or received the PSSCH 605 may prepare to transmit or receive the PSFCH 607. After transmission or reception of the PSFCH 607, a period (guard) vacant for a predetermined time may be secured.

Figure 7:
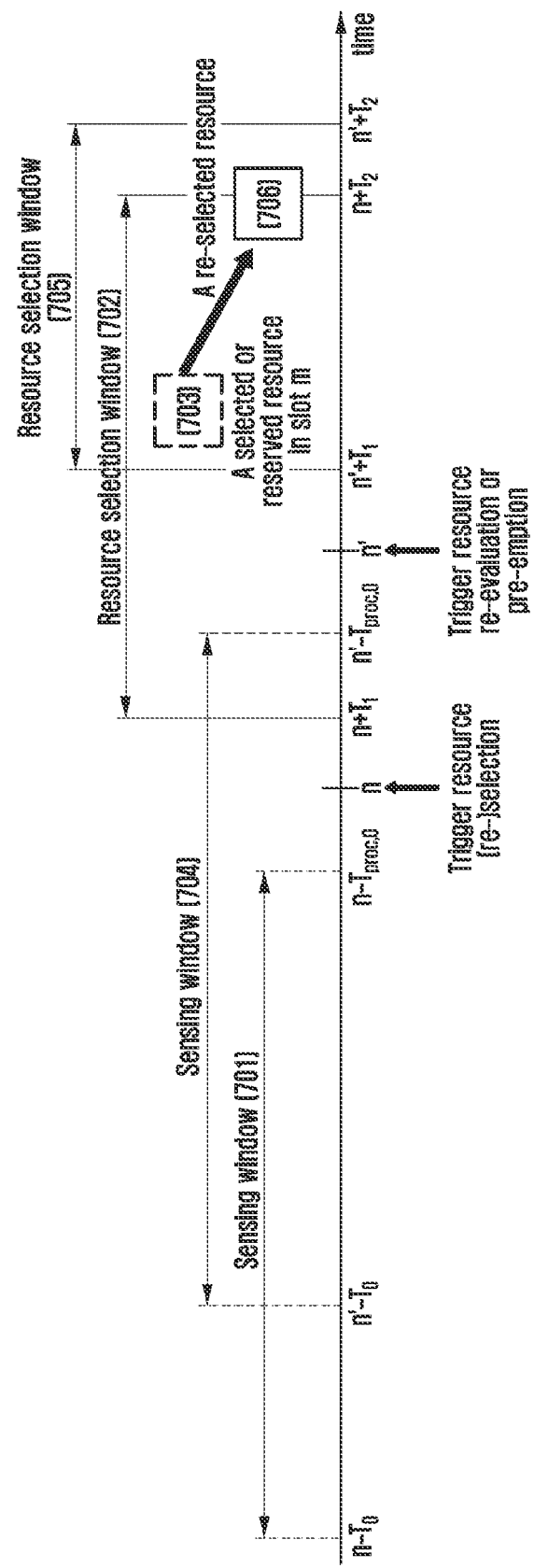
FIG. 7 illustrates a sensing window and a resource selection window for a terminal to perform resource (re)selection and re-evaluation for resource allocation in a sidelink in a case of full sensing operation, according to an embodiment.

FIG. 7 illustrates a sensing window and a resource selection window for a terminal to perform resource (re)selection and re-evaluation for resource allocation in a sidelink in a full sensing operation, according to an embodiment.

Referring to FIG. 7, when a triggering for resource (re)selection is made at time point n, a sensing window 701 may be defined to be [n−$T_0$, n−$T_{proc,0}$]. Here, $T_0$ is a start point of the sensing window and may be (pre-)configured with resource pool information. $T_0$ may be defined to be a positive integer in ms, but is not limited to a specific value. $T_{proc,0}$ may be defined to be time required to process a sensed result, but is not limited to a specific value. For example, $T_{proc,0}$ may be defined to be a positive integer in ms or in units of slots.

When a triggering for resource (re)selection is made at time point n, a resource selection window 702 may be determined to be [n+$T_1$, n+$T_2$]. Here, $T_1$ is a value in units of slots and may be selected by terminal implementation with respect to $T_1 \leq T_{proc,1}$. $T_{proc,1}$ may be defined to be a maximum reference value in consideration of a processing time required to select a resource. For example, $T_{proc,1}$ may be defined to be a different value according to SCS in units of slots. A value configured to $T_{proc,1}$ is not limited to a specific value.

$T_2$ is a value in units of slots and may be selected by a terminal within a range that satisfies $T_{2min} \leq T_2 \leq$ remaining packet delay budget (PDB). Here, $T_{2min}$ is to prevent the terminal from selecting $T_2$ having an excessively small value. The $T_{2min}$ value may be configured as "$T_{2min}$ (prio$_{TX}$)" in a higher layer according to priority (prio$_{TX}$) and SCS of a transmission terminal. The terminal may select a transmission resource in the resource selection window 702.

FIG. 7 illustrates an example in which triggering for resource (re)selection is made at time point n, and triggering for re-evaluation and pre-emption is made at time point n' (n'>n) by continuously performing sensing even after time point n. Specifically, triggering for resource (re)selection is made at time point n, sensing is continuously performed after selecting a transmission resource, and if it is determined that the selected resource is not suitable for transmission, re-evaluation may be triggered at time point n' (n'>n). When a resource reserved by the terminal overlaps with a resource reserved by another terminal, if a priority of the resource reserved by another terminal is high and an interference to the resource is measured to be high, pre-emption may be triggered at time point n'(n'>n). In this case, a resource 703 selected and reserved by resource (re)selection at time point n may be changed to another resource 706. FIG. 7 illustrates both a sensing window 704 and a resource selection window 705 for time point n' (n'>n) at which re-evaluation and pre-emption are triggered.

Figure 8:
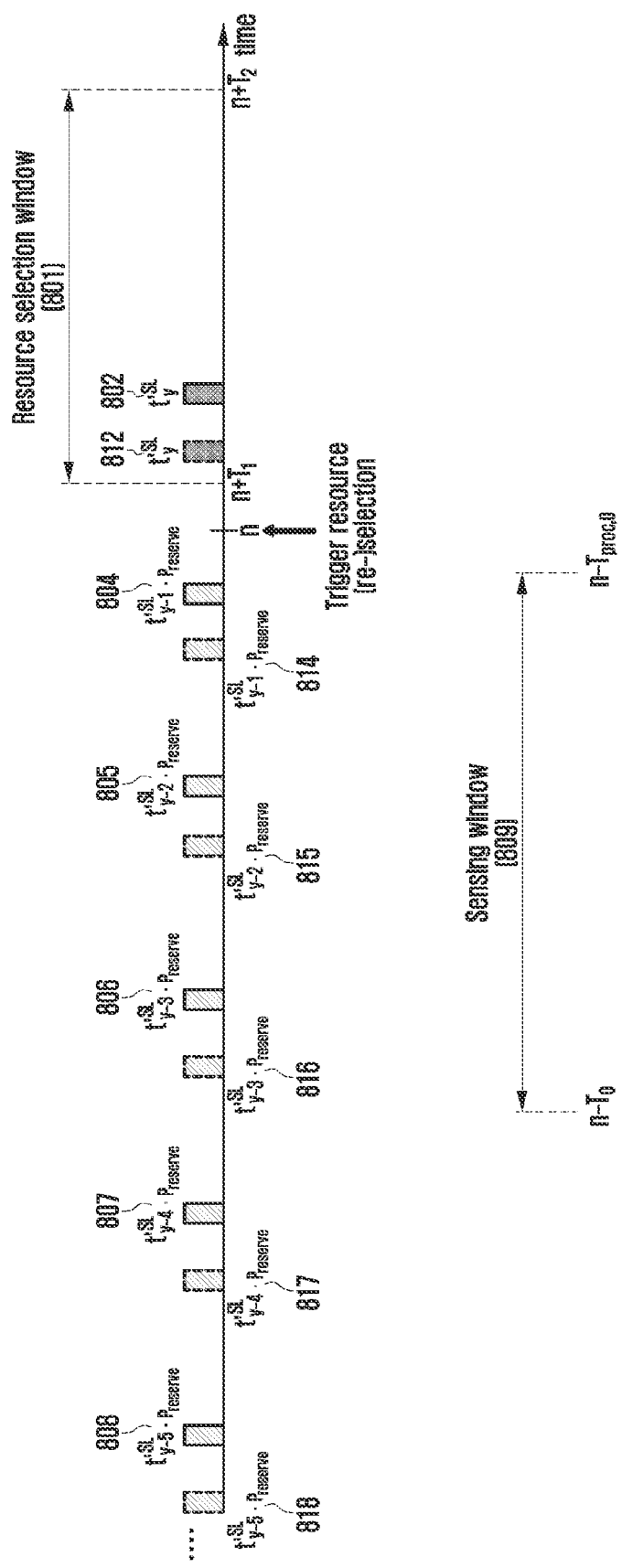
FIG. 8 illustrates a method of performing partial sensing in a sidelink according to an embodiment.
Figure 9:
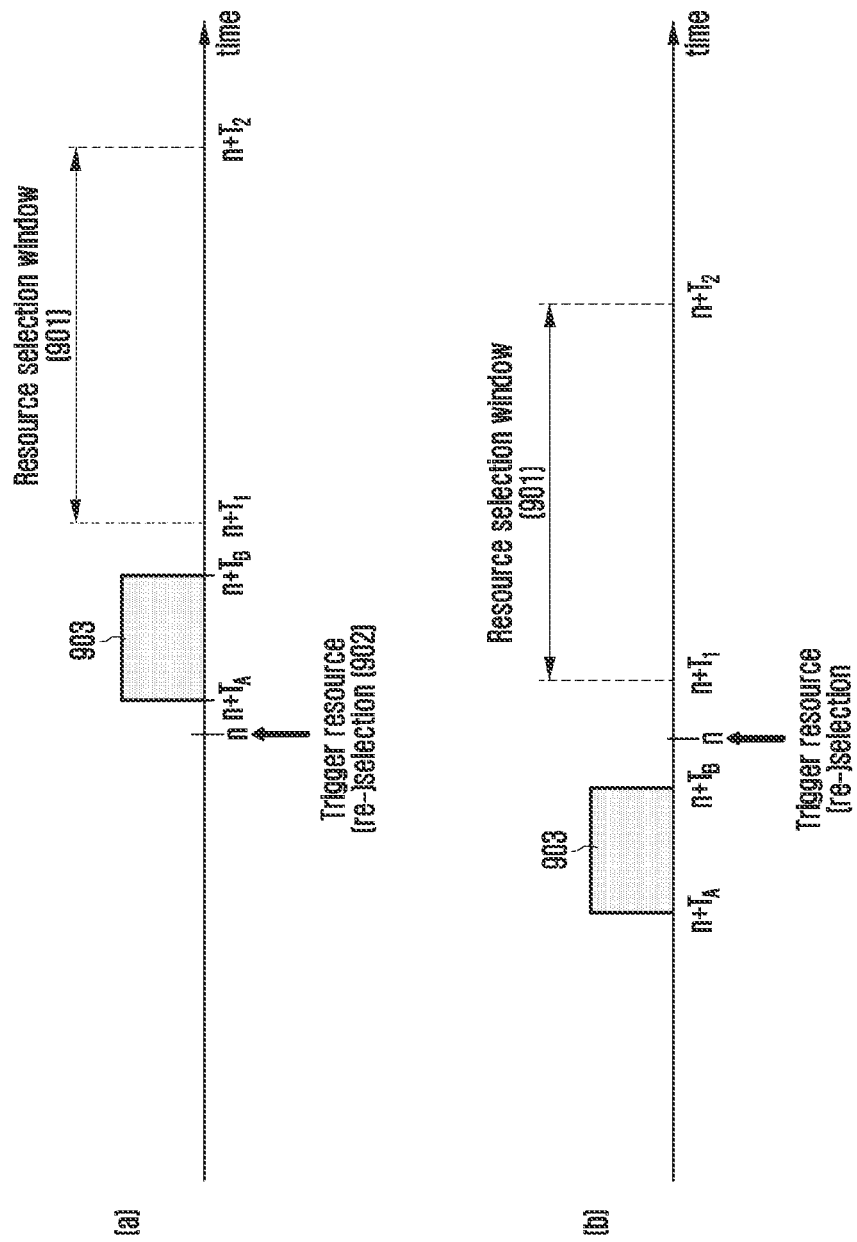
FIG. 9 illustrates a method of performing partial sensing in a sidelink according to an embodiment.

FIGS. 8 and 9 illustrate methods of performing partial sensing in a sidelink according to embodiments. Unlike the full sensing illustrated in FIG. 7, FIGS. 8 and 9 illustrate different methods of determining a slot for performing sensing when a terminal operates with partial sensing. It is noted, however, that the disclosure is not limited to the methods illustrated via FIGS. 8 and 9. In FIGS. 8 and 9, when partial sensing is performed, resource selection windows 801 to 901 may be determined as described via 702 of FIG. 7.

More specifically, a method of performing partial sensing is presented in FIG. 8, in which a slot for performing sensing is determined based on a periodic reservation interval, and may be referred to as periodic-based partial sensing.

Referring to FIG. 8, Y ($\geq 1$) candidate slots may be selected in the resource selection window 801. The Y candidate slots may be selected contiguously or non-contiguously in time in the resource selection window. A minimum value of Y may be (pre-)configured. A final selection of the Y value and a slot to be selected may be determined by terminal implementation. One of the Y candidate slots may be defined to be $t'^{SL}_y$ as shown in 802.

As described above with reference to FIG. 3, $t'^{SL}_y$ may indicate a sidelink slot belonging to a resource pool. A slot for performing sensing via periodic-based partial sensing may be determined to be $t'^{SL}_{y-k \times P_{reserve}}$. Here, vector y indicates Y candidate slots, and may be expressed to be y in a case of a single slot, as shown in FIG. 8.

Vector $P_{reserve}$, which is a value corresponding to a periodic reservation interval, may include one or more values, and may be expressed as $P_{reserve}$ in a case of a single value, as shown in FIG. 8. A value included in $P_{reserve}$ may be determined from sl-ResoureReservePeriodList, which is a list of (pre-)configured periodic reservation intervals in the resource pool, and the following methods may be considered. However, the disclosure is not limited to the following methods.

Method 1: All values included in sl-ResoureReservePeriodList are used.

Method 2: Only some (subset) of values included in sl-ResoureReservePeriodList are used.

Method 3: A common divisor of values included in sl-ResoureReservePeriodList is used.

Vector k in $t'_{y-k\times P_{reserve}}{}^{SL}$ is a value for determination of the number of slots for performing partial sensing, and an interval between sensing slots may be determined by a reservation interval included in $P_{reserve}$. In FIG. 8, cases where k is 1, 2, 3, 4, and 5 are illustrated. As a method of determining k, the following methods may be considered. However, the disclosure is not limited to the following methods.

Method 1: Only one latest slot is selected before Y candidate slots in consideration of a processing time for resource selection or before a time point 803 at which resource (re-)selection is triggered or before.

For example, according to FIG. 8, only a slot corresponding to 804 may be selected with respect to 802. Only a slot corresponding to 814 may be selected for 812.

Method 2: Only two latest slots are selected before the Y candidate slots in consideration of the processing time for resource selection or before the time point 803 at which resource (re-)selection is triggered or before.

For example, according to FIG. 8, only slots corresponding to 804 and 805 may be selected with respect to 802. Only slots corresponding to 814 and 815 may be selected with respect to 812.

Method 3: All $t'_{y-k\times P_{reserve}}{}^{SL}$ in the sensing window [n−T$_0$, n−T$_{proc,0}$] configured for full sensing are determined.

For example, according to FIG. 8, when the sensing window [n−T$_0$, n−T$_{proc,0}$] is configured as in 809, only slots corresponding to 804, 805, and 806 may be selected with respect to 802. Only slots corresponding to 814, 815, and 816 may be selected with respect to 812.

Method 4: Value k is determined so that only one slot is selected for one reservation interval in $P_{reserve}$, and value k may be determined by terminal implementation. A maximum value of k may be (pre-)configured.

For example, according to FIG. 8, the terminal may determine that k=2, and only a slot corresponding to 805 may be selected with respect to 802. The terminal may determine that k=2, and only a slot corresponding to 815 may be selected with respect to 812.

Method 5: One or more values of k may be (pre-)configured in a way that value k is (pre-)configured.

For example, according to FIG. 8, with respect to 802, when k=1 and k=2 are (pre-)configured, only slots corresponding to 804 and 805 may be selected. Further, with respect to 812, when k=1 and k=2 are (pre-)configured, only slots corresponding to 814 and 815 may be selected.

According to FIG. 8, with respect to 802, if only k=1 is (pre-)configured, a slot corresponding to 804 may be selected, and if only k=2 is (pre-)configured, slots corresponding to 804 and 805 may be selected. However, if two values of k=1 and 2 are (pre-)configured, the terminal should determine whether only 804 is a sensing slot or both 804 and 805 are sensing slots. The determination thereof may be left to terminal implementation. Alternatively, the determination may be made according to a specific criterion. For example, the terminal may determine a value to be applied from among one or more configuration values, by using a channel busy ratio (CBR). A CBR is an index indicating a degree of congestion of a sidelink channel, and the terminal may measure, by measuring a CBR, a degree at which a channel is congested. If the terminal cannot measure a CBR, a (pre-)configured CBR value may be assumed. In this case, a CBR threshold for selecting of one among multiple values of k may be determined, and the terminal may select value k via comparison of a measured (or (pre-)configured) CBR with the CBR threshold. For example, since a higher CBR indicates a more congested channel, it is important to perform better sensing to prevent conflict in resource selection so that, if the measured (or (pre-)configured) CBR is higher than the CBR threshold, the terminal may secure more sensing slots by selecting a higher k value. Alternatively, if the measured (or (pre-)configured) CBR is lower than the CBR threshold, the terminal may perform sensing with only a small number of sensing slots by selecting a low k value. In this case, the CBR threshold may be (pre-)configured, or may also be determined by terminal implementation. One or more CBR thresholds may also be configured.

Method 6: Value k is determined by (pre-)configuration using a bitmap.

For example, according to FIG. 8, with respect to 802, when a bitmap with a length of 5 is used and (pre-)configuration is performed to [10110], only slots corresponding to 805, 806, and 808 may be selected. Further, with respect to 812, when a bitmap with a length of 5 is used and (pre-)configuration is performed to [10110], only slots corresponding to 815, 816, and 818 may be selected.

It is noted that the disclosure is not limited to the above methods in determination of k. Combinations of the above methods may be considered.

Specifically, one or more of the above methods may be concurrently supported, and the terminal may select one of the supported methods. In this case, selecting of one method among the multiple methods may be left to terminal implementation. Alternatively, it may be determined that one method is selected based on a specific criterion.

For example, if both Method 1 and Method 2 are supported, the terminal may determine whether to use Method 1 or Method 2, based on a CBR. A CBR is an index indicating a degree of congestion of a sidelink channel, and the terminal may measure, by measuring a CBR, a degree at which a channel is congested. If the terminal cannot measure a CBR, a (pre-)configured CBR value may be assumed. In this case, a CBR threshold for selecting of Method 1 and Method 2 may be determined, and the terminal may select one of Method 1 and Method 2 via comparison of a measured (or (pre-)configured) CBR with the CBR threshold. For example, since a higher CBR indicates a more congested channel, it is important to perform better sensing to prevent conflict in resource selection so that, if the measured (or (pre-)configured) CBR is higher than the CBR threshold, the terminal may secure two sensing slots by using Method 2.

Alternatively, if the measured (or (pre-)configured) CBR is lower than the CBR threshold, the terminal may perform sensing with only one sensing slot by using Method 1. In this case, the CBR threshold may be (pre-)configured, or may also be determined by terminal implementation.

FIG. 9 illustrates another method of performing partial sensing.

Referring to FIG. 9, unlike the periodic-based partial sensing of FIG. 8, a method of performing sensing is based on continuous sensing windows and may be referred to as contiguous partial sensing.

Since partial sensing is performed in FIG. 9, a sensing window, the length of which has a value smaller than the length of the sensing window for full sensing of FIG. 7, may be used. Therefore, the sensing window for contiguous partial sensing may be defined as $[n+T_A, n+T_B]$. In this case, values of $T_A$ and $T_B$ may be configured to positive numbers as illustrated via FIG. 9A, and the values of $T_A$ and $T_B$ may be configured to negative numbers as illustrated via FIG. 9B. The values of $T_A$ and $T_B$ may be configured to a value of 0.

Figure 10:
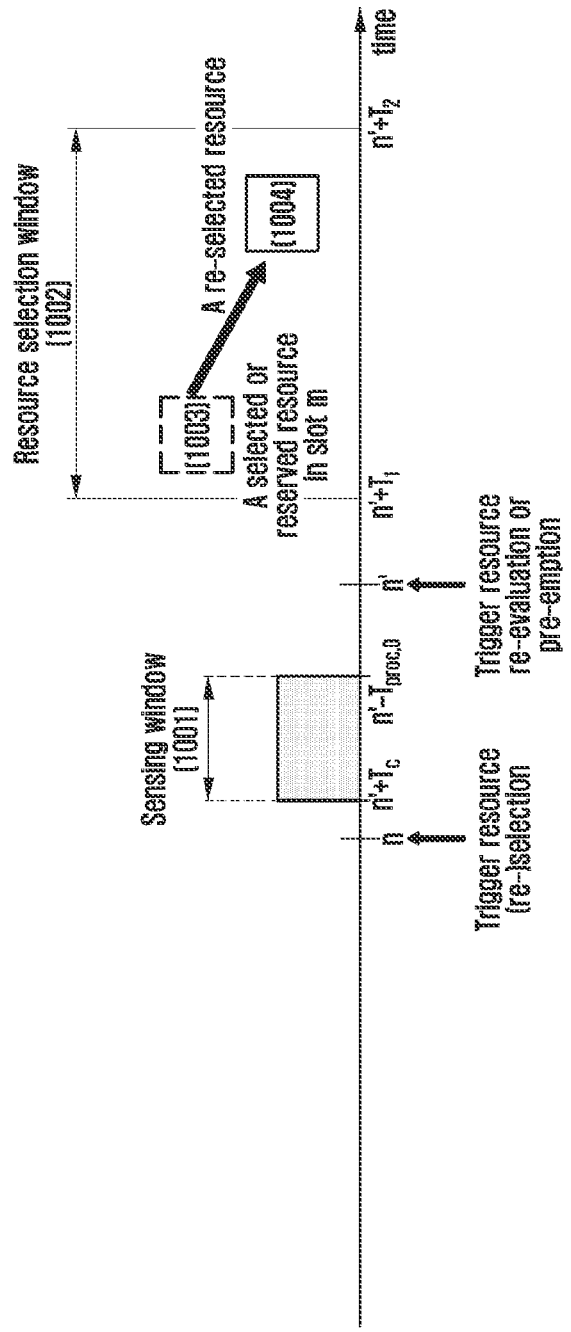
FIG. 10 illustrates a method in which re-evaluation or pre-emption is additionally performed when partial sensing or random selection is performed in a sidelink according to an embodiment.

FIG. 10 illustrates a method in which re-evaluation or pre-emption is additionally performed when partial sensing or random selection is performed in a sidelink according to an embodiment.

Referring to FIG. 10, unlike the full sensing illustrated in FIG. 7, when partial sensing or random selection is performed, a sensing window for re-evaluation and pre-emption should be configured differently. According to FIG. 10, if re-evaluation or pre-emption is triggered in slot n', a sensing window 1001 for re-evaluation and pre-emption may be defined to be $[n'-T_C, n'-T_{proc,0}]$. A value configured to $T_{proc,0}$ is not limited to a specific value. However, as described with reference to FIG. 7, the value may be configured to the same value as $T_{proc,0}$ defined in full sensing. A value configured to $T_C$ is not limited to a specific value. However, for the value, a value of 32 slots may be used as $T_C$. In this case, a resource selection window 1002 may be defined to be $[n'+T_1, n'+T_2]$. Here, reference is made to the descriptions of $T_1$ and $T_2$ in FIG. 7.

If a resource selection mode is determined by partial sensing or random selection in a sidelink, and re-evaluation or pre-emption is additionally performed, a terminal may reselect another resource 1004 within the resource selection window 1002 via a sensing result in the sensing window 1001, which is for re-evaluation and pre-emption of an already selected or reserved resource 1003. In the case of random selection, only a terminal capable of performing sensing may perform re-evaluation and pre-emption.

In a sidelink, if one of the resource selection modes (e.g., a resource selection mechanism, a resource selection scheme, or a sensing scheme) described with reference to FIGS. 7 to 9, i.e., full sensing, partial sensing (periodic-based or contiguous), and random selection, is used, the terminal may perform resource selection using a corresponding method. However, if one or more resource selection modes are (pre-)configured with resource pool information, the terminal should select a corresponding mode. Specifically, the following cases in which one or more resource selection modes are (pre-)configured with resource pool information may be considered.

Case 1: Full sensing and random selection
Case 2: Full sensing and partial sensing
Case 3: Full sensing, partial sensing, and random selection
Case 4: Partial sensing and random selection For convenience of description, partial sensing and random selection are described herein as a power saving mode, but the disclosure is not limited thereto.

Partial sensing may be subdivided into periodic-based partial sensing and contiguous partial sensing. If one or more resource selection modes are (pre-)configured in the resource pool, an additional method should be considered for terminals, which operate in the corresponding pool, to determine a resource selection mode. Therefore, the following embodiments provide methods of selecting a resource selection mode by a terminal when one or more resource selection modes are (pre-)configured with resource pool information as described above.

Figure 11A:
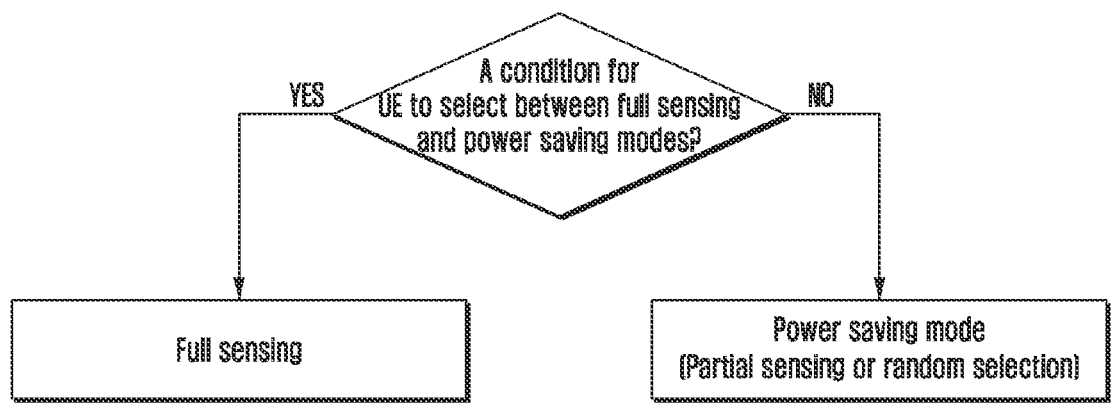
FIGS. 11A to 11C illustrate a method of a terminal for selecting a resource selection mode when one or more resource selection modes are (pre-)configured with resource pool information according to an embodiment.
Figure 11B:
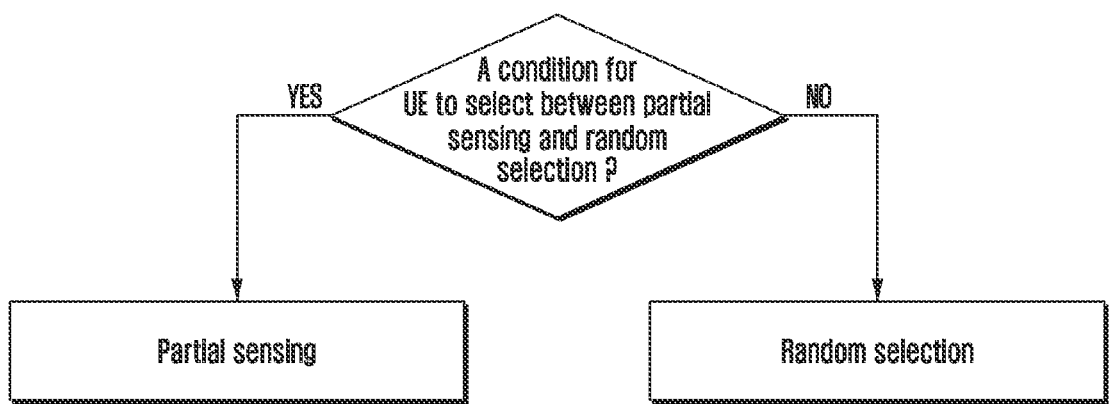
Figure 11C:
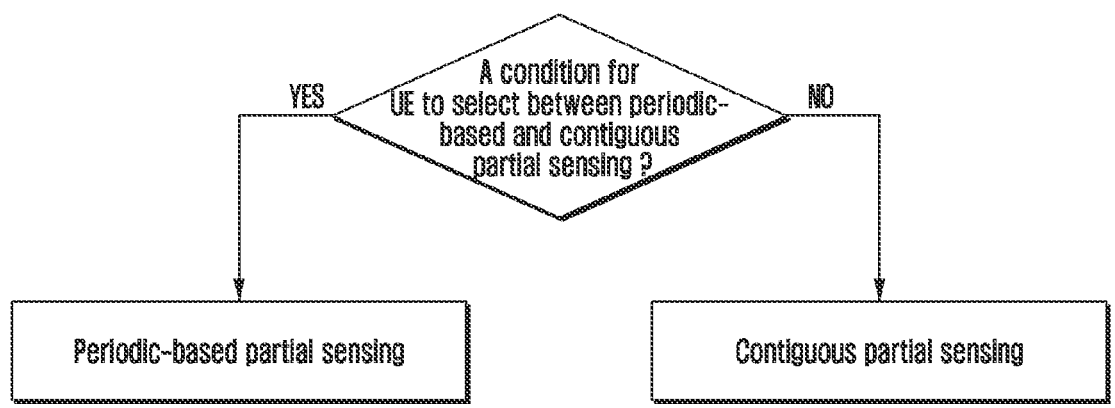

FIGS. 11A to 11C illustrate methods of selecting a resource selection mode by a terminal when one or more resource selection modes are (pre-)configured with resource pool information according to an embodiment.

Referring to FIG. 11A, the terminal may select one of full sensing and power saving mode (partial sensing and random selection) by considering a condition of selecting one of full sensing and power saving mode, and then the terminal performs sensing.

Referring to FIG. 11B, the terminal may select one of partial sensing and random selection by considering a condition of selecting one of partial sensing and random selection, and then the terminal performs sensing.

Referring to FIG. 11C, the terminal may select one of periodic-based partial sensing and contiguous partial sensing by considering a condition of selecting one of periodic-based partial sensing and contiguous partial sensing, and then the terminal performs sensing.

A resource selection mode selected by a terminal may be fixed or statically determined according to time, or may be adaptively changed according to a state (power state) of a terminal. The terminal may select a resource selection mode suitable for a transmission situation in a sidelink so as to perform Mode 2 resource allocation. The following embodiments may be used in combination with each other.

First Embodiment

In accordance with a first embodiment, methods are provided for selecting a full sensing mode or a power saving mode (e.g., a partial sensing or a random selection) when one or more resource selection modes are (pre-)configured with resource pool information. This may occur in Case 1, Case 2, or Case 3 in the aforementioned descriptions. As a condition of selecting a full sensing mode or a power saving mode as illustrated in FIG. 11A, the following alternatives may be considered. However, the disclosure is not limited to the alternatives below, and/or a combination of the alternatives below may be used.

Alternative 1: Information on a resource mode in which the terminal should operate is additionally (pre-)configured.

According to Alternative 1, whether the terminal should operate with full sensing or should operate in the power saving mode (e.g., partial sensing and random selection) may be (pre-)configured for the terminal. Therefore, although various resource selection modes coexist in the resource pool, the terminal determines a resource selection mode via (pre-)configured configuration information.

In Alternative 1, (pre-)configuration may be distinguished from information (pre-)configured with resource pool information. For example, one or more modes may be (pre-)configured in the resource pool (e.g., modes A, B, and C), and information (pre-)configured independently of resource pool configuration information may indicate a mode to be used from among the modes (pre-)configured in the resource pool. Alternative 1 may include a method in which information on a resource mode in which the terminal should operate is preconfigured. Unlike the aforementioned (pre-)configuration, once the terminal is preconfigured, changing to another configuration may not be possible.

Alternative 2: A resource selection mode in which the terminal should operate is determined by terminal capability.

According to Alternative 2, whether the terminal should operate with full sensing or should operate in the power saving mode (partial sensing and random selection) may be determined by terminal capability. For example, the terminal capability may be divided into a low energy (LE) terminal and a high energy (HE) terminal, and the LE terminal may operate in the power saving mode (partial sensing and random selection), and the HE terminal may operate with full sensing. The terminal capability may be reported to a base station through a Uu link or to a peer terminal through a PC5 link.

Alternative 3: Selection is made by terminal implementation.

According to Alternative 3, whether the terminal should operate with full sensing or should operate in the power saving mode (partial sensing and random selection) may be determined by terminal implementation. In this case, a method of reporting a resource selection mode selected by the terminal to a base station through a Uu link or to a peer terminal through a PC5 link may be additionally considered. This may be used as information for identification of a state of the terminal by the base station, and the peer terminal may also be used as information for identification of the state of the terminal. The latter case may be used for inter-UE coordination. For example, when the peer terminal provides resource selection information via inter-UE coordination, whether to provide the resource selection information may be determined according to a resource selection mode of the corresponding terminal. For example, a method of, only when the corresponding terminal is in the power saving mode, providing the resource selection information by the peer terminal via inter-UE coordination may be considered.

Alternative 4: A determination is made by sidelink discontinuous reception (SL-DRX).

According to Alternative 4, whether the terminal should operate with full sensing or should operate in the power saving mode (partial sensing and random selection) may be determined according to an SL-DRX state. SL-DRX may be configured and operated in a sidelink, and since SL-DRX is basically a configuration for the terminal to reduce power consumption, the resource selection mode may be determined according to whether SL-DRX is configured and operated. Because full sensing consumes more power compared to the power saving mode, a method of selecting full sensing if no SL-DRX is configured, and otherwise (if SL-DRX is configured and operated), operated and selecting the power saving mode may be considered. In the case of Alternative 4, it may be interpreted that the resource selection mode is implicitly determined according to whether SL-DRX is configured and operated. Contrary to this, a method of selecting the power saving mode (partial sensing and random selection) if SL-DRX is configured and operated, and otherwise, determining the resource selection mode by using one of the alternatives presented in the embodiments may be considered.

Alternative 5: A determination is made by a CBR.

According to Alternative 5, whether the terminal should operate with full sensing or should operate in the power saving mode (partial sensing and random selection) may be determined by a CBR. A CBR is a value obtained by measuring a congestion degree of a sidelink channel, wherein as the congestion degree of the channel increases, more terminals occupy the channel and a probability of conflict in resource occupation increases. Thus, it may be necessary to perform better sensing to lower the probability of conflict. Therefore, a CBR threshold used for a resource selection mode may be defined, and the resource selection mode may be determined according to a measured CBR. Because full sensing performs better sensing compared to the power saving mode (partial sensing and random selection) so as to avoid conflict, a method of selecting full sensing if a measured CBR level is higher than the CBR threshold, and otherwise, selecting the power saving mode (partial sensing and random selection) may be considered. In this case, the CBR level and the CBR threshold may be determined in association with a priority.

Specifically, the CBR level and the CBR threshold may vary according to a priority. The priority may be a priority for a packet and may be priority information transmitted via SCI by the terminal.

Configuration of the CBR threshold may be determined by terminal implementation and may be determined to be a fixed value, and a method of (pre-)configuring the corresponding value may be considered.

Alternative 6: A determination may be made by a priority of a packet.

According to Alternative 6, whether the terminal should operate with full sensing or should operate in the power saving mode (partial sensing and random selection) may be determined by a priority of a packet. The priority may be a priority for the packet and may be priority information transmitted via SCI by the terminal. As the priority of the packet increases, better sensing should be performed to reduce a probability of conflict. Therefore, a priority threshold used for a resource selection mode may be defined, and the resource selection mode may be determined according to the priority. Because full sensing performs better sensing compared to the power saving mode (partial sensing and random selection) so as to avoid conflict, a method of selecting full sensing if the packet priority is higher than the priority threshold of the packet, and otherwise, selecting the power saving mode (partial sensing and random selection) may be considered.

Configuration of the priority threshold may be determined by terminal implementation and may be determined to be a fixed value, and a method of (pre-)configuring the corresponding value may be considered.

Alternative 7: A determination is made according to a battery state of the terminal.

According to Alternative 7, whether the terminal should operate with full sensing or should operate in the power saving mode (partial sensing and random selection) may be determined according to a battery state of the terminal.

Specifically, a resource selection mode may be determined according to a remaining battery level of the terminal. Therefore, a battery threshold used for a resource selection mode may be defined, and the resource selection mode may be determined according to the battery state.

Because full sensing consumes more power compared to the power saving mode (partial sensing and random selection), a method of selecting full sensing if the battery state (e.g., the remaining battery level is X %) has a value higher than the battery threshold (e.g., the remaining battery level is Y %) (e.g., X>Y or X≥Y) and selecting the power saving mode (partial sensing and random selection) otherwise may be considered.

Configuration of the battery threshold may be determined by terminal implementation and may be determined to be a fixed value, and a method of (pre-)configuring the corresponding value may be considered. In the case of Alternative 7, it may be interpreted that division is performed into an LE terminal and an HE terminal according to the battery state of the terminal. A method in which information on whether the terminal is LE or HE is reported to a base station through a Uu link or to a peer terminal through a PC5 link may be additionally considered.

Second Embodiment

In accordance with a second embodiment, methods are provided for selecting partial sensing or random selection when one or more resource selection modes are (pre-)configured with resource pool information. This may occur in Case 3 or Case 4 in the aforementioned descriptions. As a condition of selecting one of partial sensing and random selection as illustrated in FIG. 11B, the following alternatives may be considered. However, the disclosure is not limited to the alternatives below, and/or a combination of the alternatives below may be used.

Alternative 1: Information on a resource mode in which the terminal should operate is additionally (pre-)configured.

According to Alternative 1, whether the terminal should operate with partial sensing or should operate with random selection may be (pre-)configured for the terminal. Although various resource selection modes coexist in a resource pool, the terminal determines a resource selection mode via (pre-)configured configuration information. In Alternative 1, (pre-)configuration may be distinguished from information (pre-)configured with the resource pool information. For example, one or more modes may be (pre-)configured in the resource pool (e.g., modes A, B, and C), and information (pre-)configured independently of the resource pool configuration information may indicate a mode to be used from among the modes (pre-)configured in the resource pool. Alternative 1 may include a method in which information on a resource mode in which the terminal should operate is preconfigured. Unlike the aforementioned (pre-)configuration, once the terminal is preconfigured, changing to another configuration may not be possible.

Alternative 2: A resource selection mode in which the terminal should operate is determined by terminal capability.

According to Alternative 2, whether the terminal should operate with partial sensing or with random selection may be determined by terminal capability. Whether to operate with full sensing may also be determined by the terminal capability as described above in the First Embodiment. The terminal capability may be reported to a base station through a Uu link or to a peer terminal through a PC5 link.

Alternative 3: Selection is made by terminal implementation.

According to Alternative 3, whether the terminal should operate with partial sensing or should operate with random selection may be determined by terminal implementation. In this case, a method of reporting a resource selection mode selected by the terminal to a base station through a Uu link or to a peer terminal through a PC5 link may be additionally considered. This may be used as information for identification of a state of the terminal by the base station, and the peer terminal may also be used as information for identification of the state of the terminal.

Alternative 4: A determination is made by SL-DRX.

According to Alternative 4, whether the terminal should operate with partial sensing or should operate with random selection may be determined by an SL-DRX state. If SL-DRX is configured and operated in a sidelink, because a PSCCH cannot be received and decoded in a DRX inactive time, sensing cannot be performed. Specifically, sensing may be performed via PSCCH decoding and channel measurement. Therefore, a resource selection mode may be determined according to whether SL-DRX is configured and operated.

Because partial sensing performs sensing and random selection may not perform sensing, a method of selecting partial sensing if no SL-DRX is configured and operated, and otherwise (e.g., if SL-DRX is configured and operated), selecting random selection mode may be considered.

In the case of Alternative 4, it may be interpreted that the resource selection mode is implicitly determined according to whether SL-DRX is configured and operated. Contrary to this, a method of selecting random selection if SL-DRX is configured and operated, and otherwise, determining the resource selection mode by using one of the alternatives presented in the embodiments may be considered.

Alternative 5: A determination is made by a CBR.

According to Alternative 5, whether the terminal should operate with partial sensing or should operate with random selection may be determined by a CBR. A CBR is a value obtained by measuring a congestion degree of a sidelink channel, wherein as the congestion degree of the channel increases, more terminals occupy the channel and a probability of conflict in resource occupation increases. Thus, it may be necessary to perform better sensing to lower the probability of conflict. Therefore, a CBR threshold used for a resource selection mode may be defined, and the resource selection mode may be determined according to a measured CBR. Because, compared to random selection, partial sensing allows for avoidance of conflict by performing sensing, a method of selecting partial sensing if the measured CBR level is higher than the CBR threshold, and otherwise, selecting random selection may be considered. In this case, the CBR level and the CBR threshold may be determined in association with a priority. Specifically, the CBR level and the CBR threshold may vary according to a priority. The priority may be a priority for a packet and may be priority information transmitted via SCI by the terminal.

Configuration of the CBR threshold may be determined by terminal implementation and may be determined to be a fixed value, and a method of (pre-)configuring the corresponding value may be considered.

Alternative 6: A determination may be made by a priority of a packet.

According to Alternative 6, whether the terminal should operate with partial sensing or should operate with random selection may be determined by a priority. The priority may be a priority for a packet and may be priority information transmitted via SCI by the terminal. As the priority of the packet increases, better sensing should be performed to reduce a probability of conflict. Therefore, a priority threshold used for a resource selection mode may be defined, and the resource selection mode may be determined according to the priority.

Because, compared to random selection, partial sensing allows for the avoidance of conflict by performing sensing, a method of selecting partial sensing if the packet priority is higher than the priority threshold, and selecting random selection otherwise may be considered.

Configuration of the priority threshold may be determined by terminal implementation and may be determined to be a fixed value, and a method of (pre-)configuring the corresponding value may be considered.

Alternative 7: A determination is made according to a battery state of a terminal.

According to Alternative 7, whether the terminal should operate with partial sensing or should operate with random selection may be determined by a battery state of the terminal.

Specifically, a resource selection mode may be determined according to a remaining battery level of the terminal. Therefore, a battery threshold used for a resource selection mode may be defined, and the resource selection mode may be determined according to the battery state.

Because partial sensing consumes more power compared to random selection, a method of selecting partial sensing if the battery state (e.g., the remaining battery level is X %) has a value higher than the battery threshold (e.g., the remaining battery level is Y %) (e.g., X>Y or X≥Y), and otherwise, selecting random selection may be considered.

Configuration of the battery threshold may be determined by terminal implementation and may be determined to be a fixed value, and a method of (pre-)configuring the corresponding value may be considered.

Third Embodiment

In accordance with a third embodiment, methods are provided for selecting periodic-based partial sensing or contiguous partial sensing with respect to a case where partial sensing is (pre-)configured with resource pool information in a resource selection mode. This may occur if partial sensing is the only one that is (pre-)configured, and may occur in Case 2, Case 3, or Case 4 in the aforementioned descriptions.

As a condition of selecting one of periodic-based partial sensing and contiguous partial sensing as illustrated in FIG. 11C, the following alternatives may be considered. However, the disclosure is not limited to the alternatives below, and/or a combination of the alternatives below may be used.

Alternative 1: Information on a resource mode in which a terminal should operate is additionally (pre-)configured.

According to Alternative 1, whether the terminal should operate with periodic-based partial sensing or should operate with contiguous partial sensing may be (pre-)configured for the terminal. Although various resource selection modes coexist in a resource pool, the terminal determines a resource selection mode via (pre-)configured configuration information. In Alternative 1, (pre-)configuration may be distinguished from information (pre-)configured with the resource pool information. For example, one or more modes may be (pre-)configured in the resource pool (e.g., modes A, B, and C), and information (pre-)configured independently of the resource pool configuration information may indicate a mode to be used from among the modes (pre-)configured in the resource pool. It is also noted that Alternative 1 may include a method in which information on a resource mode in which the terminal should operate is preconfigured.

Unlike the aforementioned (pre-)configuration, once the terminal is preconfigured, changing to another configuration may not be possible. A method in which (pre-)configuration is performed with resource pool information may be considered. In this case, interpretation may be performed as configuration information on whether the terminal should operate with periodic-based partial sensing or with contiguous partial sensing if partial sensing is used in the resource pool.

Alternative 2: A resource selection mode in which the terminal should operate is determined by terminal capability.

According to Alternative 2, whether the terminal should operate with periodic-based partial sensing or with contiguous partial sensing may be determined by terminal capability. Whether to operate with full sensing or random selection may also be determined by the terminal capability as described in the First Embodiment. The terminal capability may be reported to a base station through a Uu link or to a peer terminal through a PC5 link.

Alternative 3: Selection is made by terminal implementation.

According to Alternative 3, whether the terminal should operate with periodic-based partial sensing or with contiguous partial sensing may be determined by terminal capability. In this case, a method of reporting a resource selection mode selected by the terminal to a base station through a Uu link or to a peer terminal through a PC5 link may be additionally considered. This may be used as information for identification of a state of the terminal by the base station, and the peer terminal may also be used as information for identification of the state of the terminal.

Alternative 4: A determination is made by SL-DRX.

According to Alternative 4, whether the terminal should operate with periodic-based partial sensing or with contiguous partial sensing may be determined according to an SL-DRX state.

According to Alternative 4, a method in which the terminal selects contiguous partial sensing when SL-DRX is configured and operated, and selects periodic-based partial sensing otherwise may be considered.

Conversely, a method in which the terminal selects periodic-based partial sensing when SL-DRX is configured and operated, and otherwise, selects contiguous partial sensing may be considered.

Alternative 5: A determination may be made by a traffic pattern.

According to Alternative 5, whether the terminal should operate with periodic-based partial sensing or with contiguous partial sensing may be determined by a traffic pattern. The traffic pattern may indicate whether packet transmission occurs periodically or aperiodically. Periodic-based partial sensing is designed on the assumption of periodic traffic, and thus may not be suitable for aperiodic traffic.

The traffic pattern may be determined according to a service characteristic, and whether the traffic pattern is periodic or aperiodic may be thus determined in an application layer. However, resource selection of Mode 2 is made in a MAC layer.

For Alternative 5, the MAC layer of the terminal should determine whether the terminal should operate with periodic-based partial sensing or with contiguous partial sensing.

To make this possible, a method of directly informing about traffic pattern information from an application layer to a MAC layer may be considered. Alternatively, a method of determining a traffic pattern by terminal implementation in a MAC layer may be considered.

In the disclosure, a method of discovering a traffic pattern in a MAC layer is not limited to the aforementioned methods. In the disclosure, it is assumed that a traffic pattern may be known from a MAC layer.

According to Alternative 5, a method in which the terminal selects periodic-based partial sensing if a traffic pattern determined in a MAC layer is periodic traffic and selecting contiguous partial sensing in a case of aperiodic traffic may be considered.

Alternative 6: A determination may be made by whether a resource is reserved.

According to Alternative 6, whether the terminal should operate with periodic-based partial sensing or with contiguous partial sensing may be determined by whether a resource is reserved.

Whether a resource is reserved may be determined according to whether resource reservation for another TB is activated (or enabled) or deactivated (or disabled) in a resource pool.

Specifically, a case in which a value other than 0 is configured for a resource reservation interval in the resource pool may be determined as a case in which resource reservation for another TB is activated in the resource pool. Conversely, if a value for the resource reservation interval is not provided in the resource pool or is configured to 0, this may be determined to be a case in which resource reservation for another TB is deactivated in the resource pool.

In addition, the terminal includes, in 1st SCI (PSCCH), a resource reservation interval used in the configured resource reservation period so as to transmit the same. Therefore, according to Alternative 5, a method of selecting periodic-based partial sensing if resource reservation for another TB is activated in the resource pool (and if a resource reservation interval other than 0 is transmitted via the 1st SCI), and otherwise, selecting contiguous partial sensing may be configured. However, according to Alternative 6, periodic-based partial sensing may be selected if resource reservation for another TB is activated in the resource pool (and if a resource reservation interval other than 0 is transmitted via the 1st SCI) and, otherwise, whether the terminal should operate with periodic-based partial sensing or should operate with contiguous partial sensing may be selected according to other alternatives of the embodiment may be configured.

Alternative 7: A determination is made according to whether re-evaluation or (pre-)emption is activated (enabled).

According to Alternative 7, whether the terminal should operate with periodic-based partial sensing or with contiguous partial sensing may be determined according to whether re-evaluation or (pre-)emption is activated.

In the case of periodic-based partial sensing, there may be difficulties in sensing for performing re-evaluation and (pre-)emption due to a discontinuous sensing period. Therefore, a method of selecting contiguous partial sensing if re-evaluation or (pre-)emption is activated, and selecting periodic-based partial sensing otherwise may be considered. However, contiguous partial sensing may be selected if re-evaluation or (pre-)emption is activated and, otherwise, whether the terminal should operate with periodic-based partial sensing or should operate with contiguous partial sensing may be selected according to other alternatives of the embodiment.

Alternative 7 is a method of implicitly determining whether the terminal should operate with periodic-based partial sensing or should operate with contiguous partial sensing, according to whether re-evaluation or (pre-)emption is activated.

Fourth Embodiment

As described above, the first embodiment provides methods of selecting one of full sensing and the power saving mode (partial sensing or random selection) by the terminal, the second embodiment provides methods of selecting one of partial sensing and random selection, and the third embodiment provides methods of selecting one of periodic-based partial sensing and contiguous partial sensing among partial sensing methods. Since different methods may be applied to respective cases, in the fourth embodiment, the methods presented in the first to third embodiments may be sequentially applied to select a final resource selection mode. However, in the fourth embodiment, a description is focused on a method in which a resource selection mode is determined by one alternative. To this end, the following alternatives may be considered. However, the disclosure is not limited to the alternatives below.

Alternative 1: Information on a resource mode in which a terminal should operate is additionally (pre-)configured.

According to Alternative 1, whether the terminal should operate with full sensing, partial sensing, or random selection may be (pre-)configured for the terminal.

For partial sensing, whether the terminal should operate with periodic-based partial sensing and should operate with contiguous partial sensing may be (pre-)configured for the terminal. Therefore, although various resource selection modes coexist in a resource pool, the terminal determines a resource selection mode via (pre-)configured configuration information.

In Alternative 1, (pre-)configuration may be distinguished from information (pre-)configured with the resource pool information. For example, one or more modes may be (pre-)configured in the resource pool (e.g., modes A, B, and C), and information (pre-)configured independently of the resource pool configuration information may indicate a mode to be used from among the modes (pre-)configured in the resource pool.

Alternative 1 may include a method in which information on a resource mode in which the terminal should operate is preconfigured. Unlike the aforementioned (pre-)configuration, once the terminal is preconfigured, changing to another configuration may not be possible.

Alternative 2: A resource selection mode in which the terminal should operate is determined by terminal capability.

According to Alternative 2, whether the terminal should operate with full sensing, partial sensing, or random selection may be determined by terminal capability.

For partial sensing, whether the terminal should operate with periodic-based partial sensing and should operate with contiguous partial sensing may be determined by terminal capability. The terminal capability may be reported to a base station through a Uu link or to a peer terminal through a PC5 link.

Alternative 3: Selection is made by terminal implementation.

According to Alternative 3, whether the terminal should operate with full sensing, partial sensing, or random selection may be determined by terminal implementation.

For partial sensing, whether the terminal should operate with periodic-based partial sensing and should operate with contiguous partial sensing may be determined by terminal implementation. In this case, a method of reporting a resource selection mode selected by the terminal to a base station through a Uu link or to a peer terminal through a PC5 link may be additionally considered. This may be used as information for identification of a state of the terminal by the base station, and the peer terminal may also be used as information for identification of the state of the terminal.

Alternative 4: A determination is made by SL-DRX.

According to Alternative 4, whether the terminal should operate with full sensing, partial sensing, or random selection may be determined according to an SL-DRX state.

For partial sensing, whether the terminal should operate with periodic-based partial sensing and should operate with contiguous partial sensing may be determined by the SL-DRX state. For selection conditions for this, reference is made to Alternative 4 in the first to third embodiments.

Alternative 5: A determination is made by a CBR.

According to Alternative 5, whether the terminal should operate with full sensing, partial sensing, or random selection may be determined by a CBR. For details, reference is made to Alternative 5 in the first and second embodiments.

For Alternative 5, two different CBR thresholds may be defined. Specifically, CBR_threshold1 and CBR_threshold2 (CBR_threshold1>CBR_threshold2) are defined, wherein full sensing may be selected if a measured CBR is greater than CBR_threshold1, partial sensing may be selected if the measured CBR is between CBR_threshold1 and CBR_threshold2, and random selection may be selected if the measured CBR is lower than CBR_threshold2.

The CBR level and the CBR threshold may be determined in association with a priority. Specifically, the CBR level and the CBR threshold may vary according to a priority. The priority may be a priority for a packet and may be priority information transmitted via SCI by the terminal.

Configuration of the CBR threshold may be determined by terminal implementation and may be determined to be a fixed value, and a method of (pre-)configuring the corresponding value may be considered.

Alternative 6: A determination may be made by a priority of a packet.

According to Alternative 6, whether the terminal should operate with full sensing, partial sensing, or random selection may be determined by a priority. The priority may be a priority for a packet and may be priority information transmitted via SCI by the terminal. For more details, reference may be made to Alternative 6 in the first and second embodiments.

For Alternative 6, two different priority thresholds may be defined. Specifically, priority_threshold1 and priority_threshold2 (priority_threshold1>priority_threshold2) are defined, wherein full sensing may be selected if the priority of the terminal is greater than priority_threshold1, partial sensing may be selected if the priority of the terminal is between priority_threshold1 and priority_threshold2, and random selection may be selected if the priority of the terminal is lower than priority_threshold2.

Configuration of the priority threshold may be determined by terminal implementation and may be determined to be a fixed value, and a method of (pre-)configuring the corresponding value may be considered.

Alternative 7: A determination is made according to a battery state of a terminal.

According to Alternative 7, whether the terminal should operate with full sensing, partial sensing, or random selection may be determined according to a battery state of the terminal. Specifically, a resource selection mode may be determined according to a remaining battery level of the terminal. For more detail, reference may be made to Alternative 7 in the first and second embodiments.

For Alternative 7, two different battery thresholds may be defined. Specifically, battery_threshold1 and battery_threshold2 (battery_threshold1>battery_threshold2) are defined, wherein full sensing may be selected if the battery of the terminal has a value greater than battery_threshold1, partial sensing may be selected if the battery of the terminal has a value between battery_threshold1 and battery_threshold2, and random selection may be selected if the battery of the terminal has a value lower than battery_threshold2.

Configuration of the battery threshold may be determined by terminal implementation and may be determined to be a fixed value, and a method of (pre-)configuring the corresponding value may be considered.

Fifth Embodiment

In accordance with a fifth embodiment, a terminal operation is provided for selecting a resource pool when multiple resource pools are configured and different resource selection modes (i.e., full sensing, partial sensing (periodic-based and contiguous), and random selection) are configured for the respective resource pools.

As described in the aforementioned embodiments, one or more resource selection modes may be (pre-)configured in a resource pool, and in this case, the resource pool may refer to a transmission resource pool. Specifically, if a single resource selection mode is (pre-)configured in a resource pool, the terminal may operate in the configured resource selection mode. However, if one or more resource selection modes are configured, the terminal may select and determine a resource selection mode by the method disclosed in the above embodiments. If operating in Mode 1, a base station may indicate, to the terminal, a resource pool in which the terminal should operate. However, in the case of Mode 2, the terminal should directly select a resource pool.

The fifth embodiment provides a method of selecting a resource pool according to a resource selection mode configured in the resource pool. For example, there may be a case in which, even though the terminal cannot perform full sensing due to power consumption, a configured resource pool is configured for operation with full sensing. In this case, the terminal may exclude a corresponding resource pool (a resource pool available only for full sensing) from selectable resource pools. However, there may be a case in which the terminal should operate with full sensing to improve sensing accuracy. In this case, the terminal may exclude a corresponding resource pool (a resource pool which cannot support full sensing) from selectable resource pools. If multiple resource pools are configured in Mode 2, and the terminal should select a resource pool, a resource selection mode and also whether a PSFCH resource is configured in the resource pool may be considered together as described above.

Specifically, there may be a resource pool in which a PSFCH resource is configured in the resource pool so that HARQ feedback is possible, and a resource pool in which no PSFCH resource is configured in the resource pool. Therefore, if the transmission terminal requires HARQ feedback, a corresponding resource pool (a resource pool in which no PSFCH resource has been configured) may be excluded from selectable resource pools.

Figure 12:
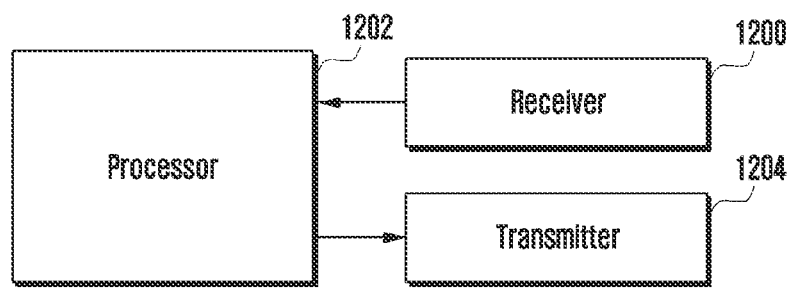
FIG. 12 illustrates a terminal according to an embodiment.
Figure 13:
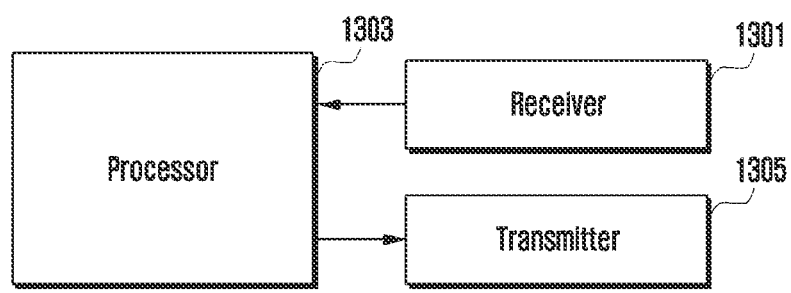
FIG. 13 illustrates a base station according to an embodiment.

In order to perform the aforementioned embodiments of the disclosure, transmitters, receivers, and processors of a terminal and a base station are illustrated in FIG. 12 and FIG. 13, respectively. The aforementioned embodiments relate to a method for performing multi-antenna transmission and reception by a terminal in a sidelink, and in order to perform this, the receivers, processors, and transmitters of the terminal and the base station may operate according to the embodiments.

FIG. 12 illustrates a terminal according to an embodiment.

Referring to FIG. 12, a terminal includes a terminal receiver 1200, a transmitter 1204, and a processor 1202. The receiver 1200 and the transmitter 1204 may collectively be referred to as a transceiver. The transceiver may transmit a signal to or receive a signal from a base station. The signal may include control information and data. To this end, the transceiver may include a radio frequency (RF) transmitter configured to perform up-conversion and amplification of a frequency of a transmitted signal, an RF receiver configured to perform low-noise amplification of a received signal and down-conversion of a frequency, etc.

In addition, the transceiver may receive a signal via a radio channel and output the signal to the processor 1202, and may transmit, via the radio channel, the signal output from the processor 1202. The processor 1202 may control a series of procedures so that the terminal may operate according to the aforementioned embodiments.

FIG. 13 illustrates a base station according to an embodiment.

Referring to FIG. 13, a base station includes a receiver 1301, a transmitter 1305, and a processor 1303. The receiver 1301 and the transmitter 1305 may collectively be referred to as a transceiver. The transceiver may transmit a signal to or receive a signal from a terminal. The signal may include control information and data. To this end, the transceiver may include an RF transmitter configured to perform up-conversion and amplification of a frequency of a transmitted signal, an RF receiver configured to perform low-noise amplification of a received signal and down-converting a frequency of the received signal, etc.

In addition, the transceiver may receive a signal via a radio channel and output the signal to the processor 1303, and may transmit, via the radio channel, the signal output from the base station processor 1303. The processor 1303 may control a series of procedures so that the base station may operate according to the aforementioned embodiment of the disclosure.

The above-described embodiments of the disclosure are merely examples that have been presented to easily explain the technical contents of the disclosure and help understanding of the disclosure, and are not intended to limit the scope of the disclosure. That is, it will be apparent to those skilled in the art that other variants based on the technical idea of the embodiments may be implemented. Further, the above respective embodiments may be employed in combination, as necessary. For example, the embodiments of the disclosure may be partially combined to operate a base station and a terminal.

In accordance with the above-described embodiments, a terminal and a method thereof are provided for, when one or more resource selection modes are (pre-)configured with resource pool information in sidelink communication, selecting corresponding modes. Accordingly, resource allocation suitable for a transmission situation in a sidelink is possible.

While the disclosure has been particularly shown and described with reference to embodiments thereof, it will be understood by those skilled in the art that various changes in form and details may be made therein without departing from the scope of the subject matter as defined by the appended claims and their equivalents.

What is claimed is:

1. A method performed by a user equipment (UE) in a communication system, the method comprising:
   determining a sidelink (SL) resource pool among multiple SL resource pools that are configured, wherein the multiple SL resource pools are respectively configured with at least one resource selection mode; and
   performing SL communication based on the SL resource pool,
   wherein the determination of the SL resource pool is based on the at least one resource selection mode, and
   wherein the at least one resource selection mode corresponds to full sensing, partial sensing, random resource selection, a combination of the full sensing and the random resource selection, a combination of the full sensing and the partial sensing, a combination of the partial sensing and the random resource selection, or a combination of the full sensing, the partial sensing, and the random resource selection.

2. The method of claim 1, wherein the SL resource pool is autonomously determined by the UE.

3. The method of claim 1, wherein the SL resource pool is determined further based on a UE capability.

4. The method of claim 3, wherein the UE capability corresponds to power consumption of the UE.

5. The method of claim 1, wherein the SL resource pool is determined further based on whether each of the multiple SL resource pools is configured with a physical sidelink feedback channel (PSFCH) resource.

6. The method of claim 1, wherein the SL resource pool is determined from among the multiple SL resource pools, except for any SL resource pool that is not configured with a physical sidelink feedback channel (PSFCH) resource, in case that the UE is configured to transmit hybrid automatic repeat request (HARQ) feedback.

7. The method of claim 1, wherein a resource selection mode for the SL communication is autonomously determined among at least one resource selection mode with which the determined SL resource pool is configured.

8. A user equipment (UE) in a communication system, the UE comprising:
   a transceiver; and
   a processor coupled with the transceiver and configured to:
      determine a sidelink (SL) resource pool among multiple SL resource pools that are configured, wherein the multiple SL resource pools are respectively configured with at least one resource selection mode; and
      perform SL communication based on the SL resource pool,
   wherein the determination of the SL resource pool is based on the at least one resource selection mode, and
   wherein the at least one resource selection mode corresponds to full sensing, partial sensing, random resource selection, a combination of the full sensing and the random resource selection, a combination of the full sensing and the partial sensing, a combination of the partial sensing and the random resource selection, or a combination of the full sensing, the partial sensing, and the random resource selection.

9. The UE of claim 8, wherein the SL resource pool is autonomously determined by the UE.

10. The UE of claim 8, wherein the SL resource pool is determined further based on a UE capability.

11. The UE of claim 10, wherein the UE capability corresponds to power consumption of the UE.

12. The UE of claim 8, wherein the SL resource pool is determined further based on whether each of the multiple SL resource pools is configured with a physical sidelink feedback channel (PSFCH) resource.

13. The UE of claim 8, wherein the SL resource pool is determined among the multiple SL resource pools, except for any SL resource pool that is not configured with a physical sidelink feedback channel (PSFCH) resource, in case that the UE is configured to transmit hybrid automatic repeat request (HARQ) feedback.

14. The UE of claim 8, wherein a resource selection mode for the SL communication is autonomously determined among at least one resource selection mode with which the determined SL resource pool is configured.

* * * * *